US012211312B2

(12) United States Patent
Kim et al.

(10) Patent No.: US 12,211,312 B2
(45) Date of Patent: Jan. 28, 2025

(54) ELECTRONIC DEVICE AND METHOD FOR PERFORMING FACE AUTHENTICATION USING A PLURALITY OF CAMERAS

(71) Applicant: Samsung Electronics Co., Ltd., Suwon-si (KR)

(72) Inventors: Minchul Kim, Suwon-si (KR); Siwoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 616 days.

(21) Appl. No.: 17/592,865

(22) Filed: Feb. 4, 2022

(65) Prior Publication Data

US 2023/0135449 A1 May 4, 2023

Related U.S. Application Data

(63) Continuation of application No. PCT/KR2022/000058, filed on Jan. 4, 2022.

(30) Foreign Application Priority Data

Nov. 2, 2021 (KR) ........................ 10-2021-0148725

(51) Int. Cl.
*G06F 21/32* (2013.01)
*G06V 40/16* (2022.01)
(52) U.S. Cl.
CPC ............ *G06V 40/167* (2022.01); *G06F 21/32* (2013.01)
(58) Field of Classification Search
CPC ................................ G06V 40/67; G06F 21/32
See application file for complete search history.

(56) References Cited

U.S. PATENT DOCUMENTS 6,490,369 B1    12/2002  Beiman
9,922,237 B2     3/2018  Li et al.
              (Continued)

FOREIGN PATENT DOCUMENTS

JP    2015-177510 A    10/2015
JP       5795650 B2    10/2015
              (Continued)

OTHER PUBLICATIONS

Extended European Search Report dated Jun. 14, 2023, issued in European Patent Application No. 22711140.8.
(Continued)

*Primary Examiner* — Myron Wyche
(74) *Attorney, Agent, or Firm* — Jefferson IP Law, LLP

(57) ABSTRACT

An electronic device and a method for performing face authentication by using multiple cameras are provided. The method of the electronic device includes an operation of receiving a request for registration of face information through a first camera device having a first characteristic, an operation of acquiring, based on the request, multiple first images through the first camera device, an operation of performing filtering for each of the multiple first images to generate multiple second images reflecting a second characteristic of the second camera device, an operation of generating multiple first templates based on the multiple first images, an operation of generating multiple second templates based on the multiple second images, and an operation of storing the multiple first templates and the multiple second templates in the memory, thereby completing the registration of the face information.

23 Claims, 14 Drawing Sheets

(56) References Cited

U.S. PATENT DOCUMENTS

| | | |
|---|---|---|
| 10,467,471 B2 | 11/2019 | Lee et al. |
| 2007/0201730 A1 | 8/2007 | Masaki et al. |
| 2011/0141257 A1 | 6/2011 | Hwang et al. |
| 2011/0222744 A1 | 9/2011 | Kim et al. |
| 2012/0213420 A1 | 8/2012 | Steiner |
| 2013/0222564 A1 | 8/2013 | Park et al. |
| 2014/0139667 A1 | 5/2014 | Kang |
| 2016/0371535 A1 | 12/2016 | Li et al. |
| 2019/0213394 A1 | 7/2019 | Mostafa et al. |
| 2019/0278974 A1 | 9/2019 | Lubin et al. |

FOREIGN PATENT DOCUMENTS

| | | |
|---|---|---|
| JP | 6248178 B2 | 12/2017 |
| KR | 10-2011-0067716 A | 6/2011 |
| KR | 10-1214732 B1 | 12/2012 |
| KR | 10-1692168 B1 | 1/2017 |
| KR | 10-2018-0108214 A | 10/2018 |
| KR | 10-1983288 B1 | 5/2019 |
| KR | 10-2021-0003916 A | 1/2021 |

OTHER PUBLICATIONS

International Search Report with Written Opinion dated Jul. 29, 2022, issued in International Patent Application No. PCT/KR2022/000058.

FIRST CONVERSION FILTER

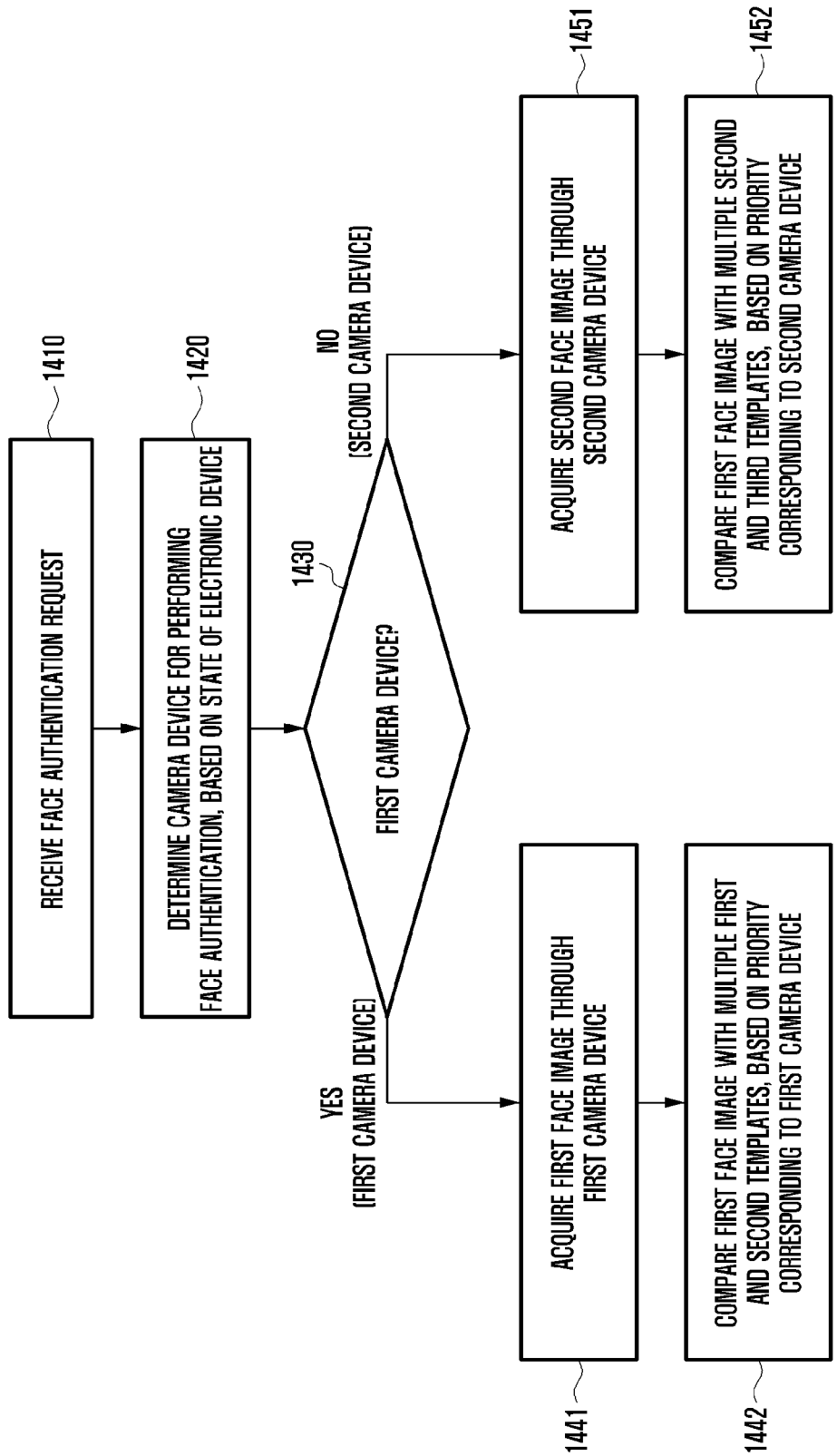

ELECTRONIC DEVICE AND METHOD FOR PERFORMING FACE AUTHENTICATION USING A PLURALITY OF CAMERAS

CROSS-REFERENCE TO RELATED APPLICATION(S)

This application is a continuation application, claiming priority under § 365(c), of an International application No. PCT/KR2022/000058, filed on Jan. 4, 2022, which is based on and claims the benefit of a Korean patent application number 10-2021-0148725, filed on Nov. 2, 2021, in the Korean Intellectual Property Office, the disclosure of which is incorporated by reference herein in its entirety.

TECHNICAL FIELD

The disclosure relates to an electronic device and a method for performing face authentication by using multiple cameras.

BACKGROUND ART

A face authentication technology is a biometric authentication technology used by an electronic device to authenticate a user based on a face image acquired through a camera. The face authentication technology may be used to confirm the identity of an authentication target in a contactless manner. The face authentication technology, due to convenience and efficiency thereof, has recently been widely used in various application fields such as security systems, mobile authentication, and multimedia data search.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

Electronic devices have recently been equipped with multiple cameras, and respective cameras may have different characteristics. For example, the characteristics may include the angle of view, resolution, noise characteristics, or transmittance characteristics of the cameras. An electronic device may pre-register the user's face information through a first camera, and the electronic device may perform face authentication based on a face image acquired through the first camera after the pre-registration or a face image acquired through a second camera. In this case, face authentication through the first camera may be highly reliable, but face authentication through the second camera having second characteristics different from the first characteristics may have low reliability. This is because characteristics of a face image captured through the second camera are different from characteristics of a face image captured through the first camera.

Aspects of the disclosure are to address at least the above-mentioned problems and/or disadvantages and to provide at least the advantages described below. Accordingly, an aspect of the disclosure is to provide an electronic device and a method, wherein in connection with face authentication by an electronic device having multiple cameras, reliability of the face authentication can be improved, and user convenience can be improved.

Technical problems to be solved by the disclosure are not limited to the above-mentioned technical problems, and other technical problems not mentioned herein will be clearly understood from the following description by those skilled in the art to which the disclosure pertains.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a first camera device having a first characteristic, a second camera device having a second characteristic different from the first characteristic, a memory, and a processor operatively connected to the first camera device, the second camera device, and the memory, wherein the memory is configured to store instructions which, when being executed, cause the processor to receive a request for registration of face information through the first camera device, acquire, based on the request, multiple first images through the first camera device, perform filtering for each of the multiple first images to generate multiple second images reflecting the second characteristic of the second camera device, generate multiple first templates, based on the multiple first images, generate multiple second templates, based on the multiple second images, and store the multiple first templates and the multiple second templates in the memory, thereby completing the registration of the face information.

In accordance with another aspect of the disclosure, a method of an electronic device including a memory, a first camera device having a first characteristic, and a second camera device having a second characteristic different from the first characteristic is provided. The method includes receiving a request for registration of face information through the first camera device, acquiring, based on the request, multiple first images through the first camera device, performing filtering for each of the multiple first images to generate multiple second images reflecting the second characteristic of the second camera device, generating multiple first templates, based on the multiple first images, generating multiple second templates, based on the multiple second images, and storing the multiple first templates and the multiple second templates in the memory, thereby completing the registration of the face information.

Advantageous Effects of Invention

An electronic device and a method according to various embodiments of the disclosure may, in connection with face authentication by an electronic device having multiple cameras, improve reliability of the face authentication and may improve user convenience.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 14 is a flowchart illustrating an operation of performing face authentication by an electronic device according to an embodiment of the disclosure.

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
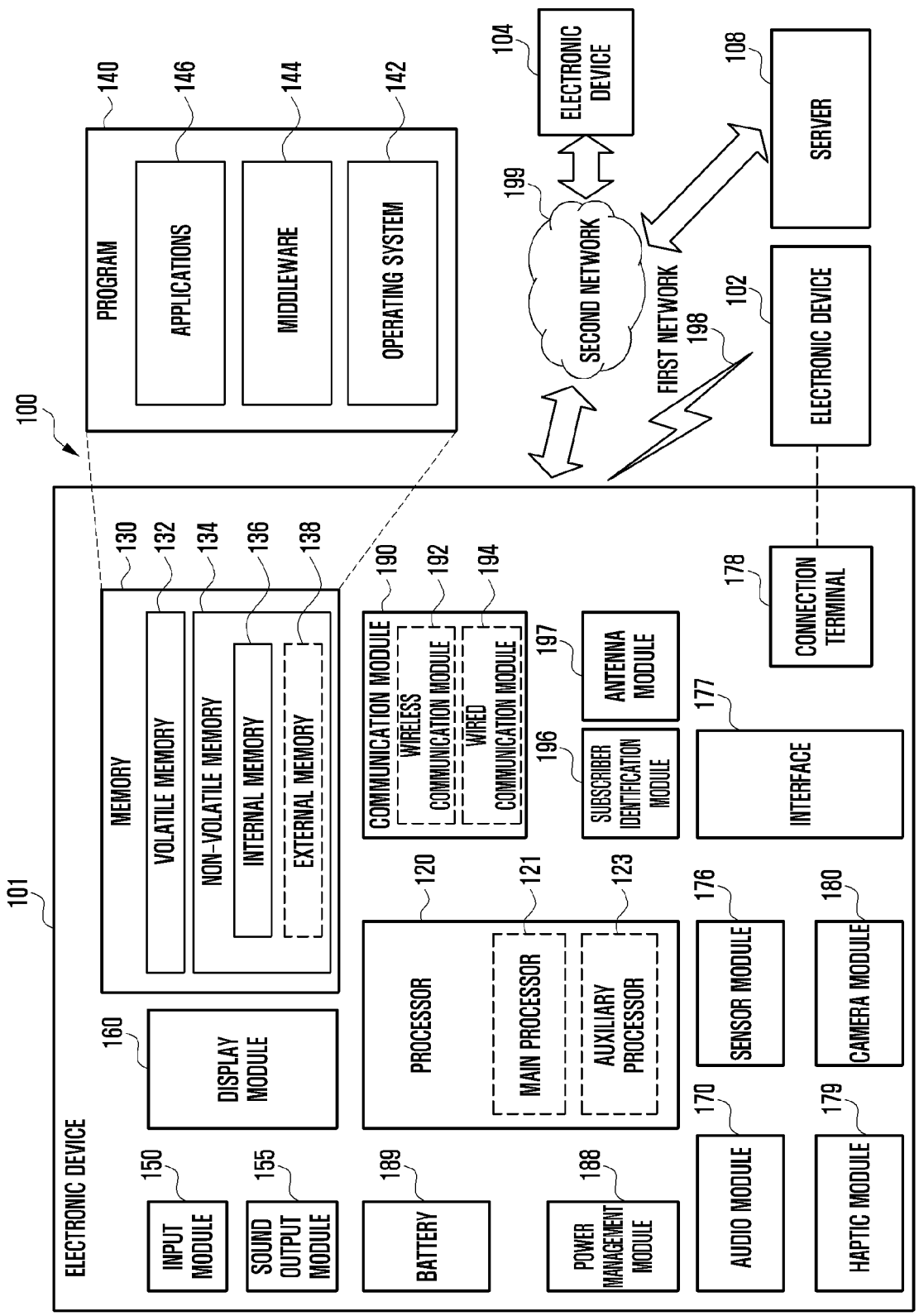
FIG. 1 is block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Figure 2:
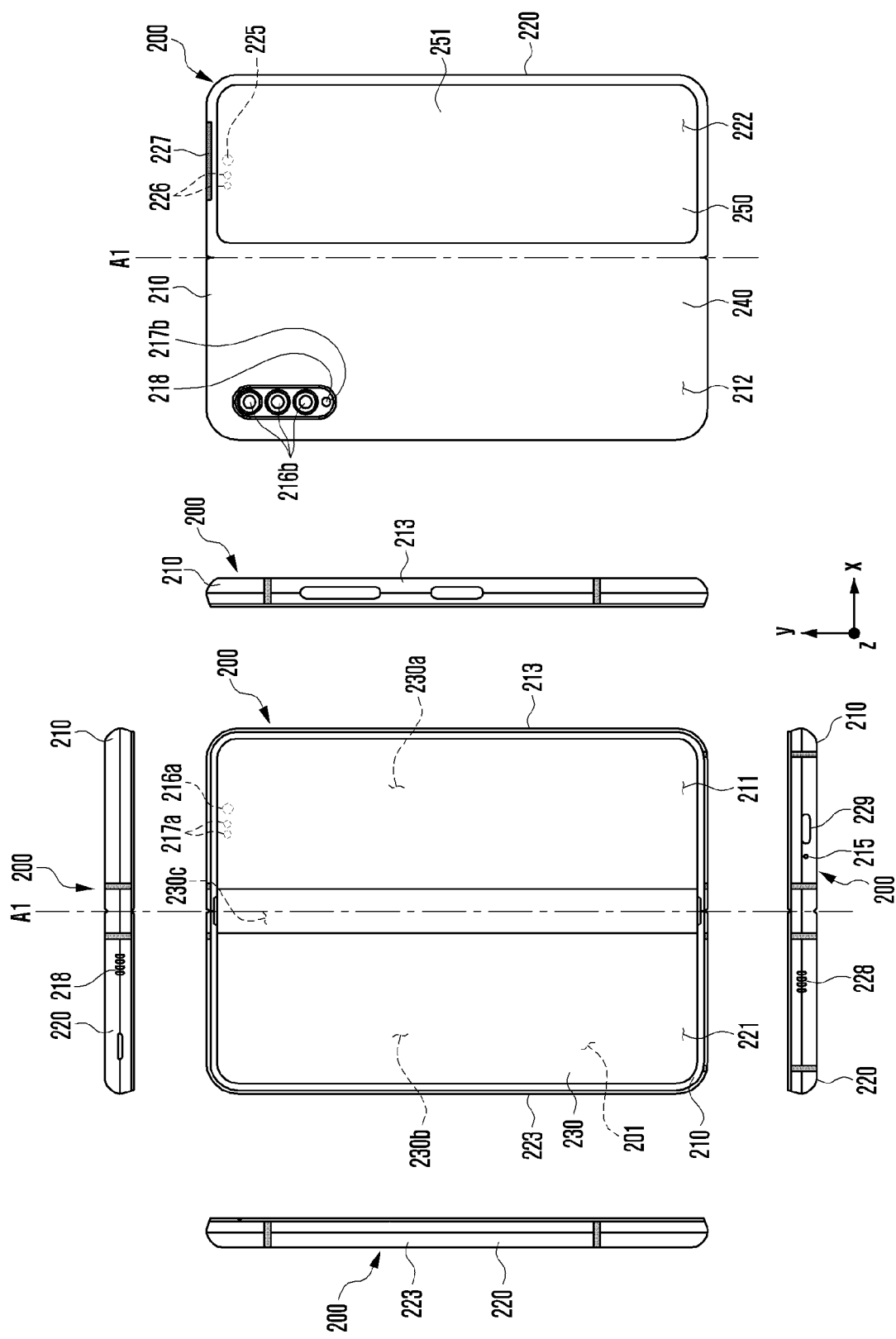
FIG. 2 illustrates an unfolded state of an electronic device according to an embodiment of the disclosure.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added. FIG. 2 illustrates the unfolded state of an electronic device according to an embodiment of the disclosure.

Figure 3:
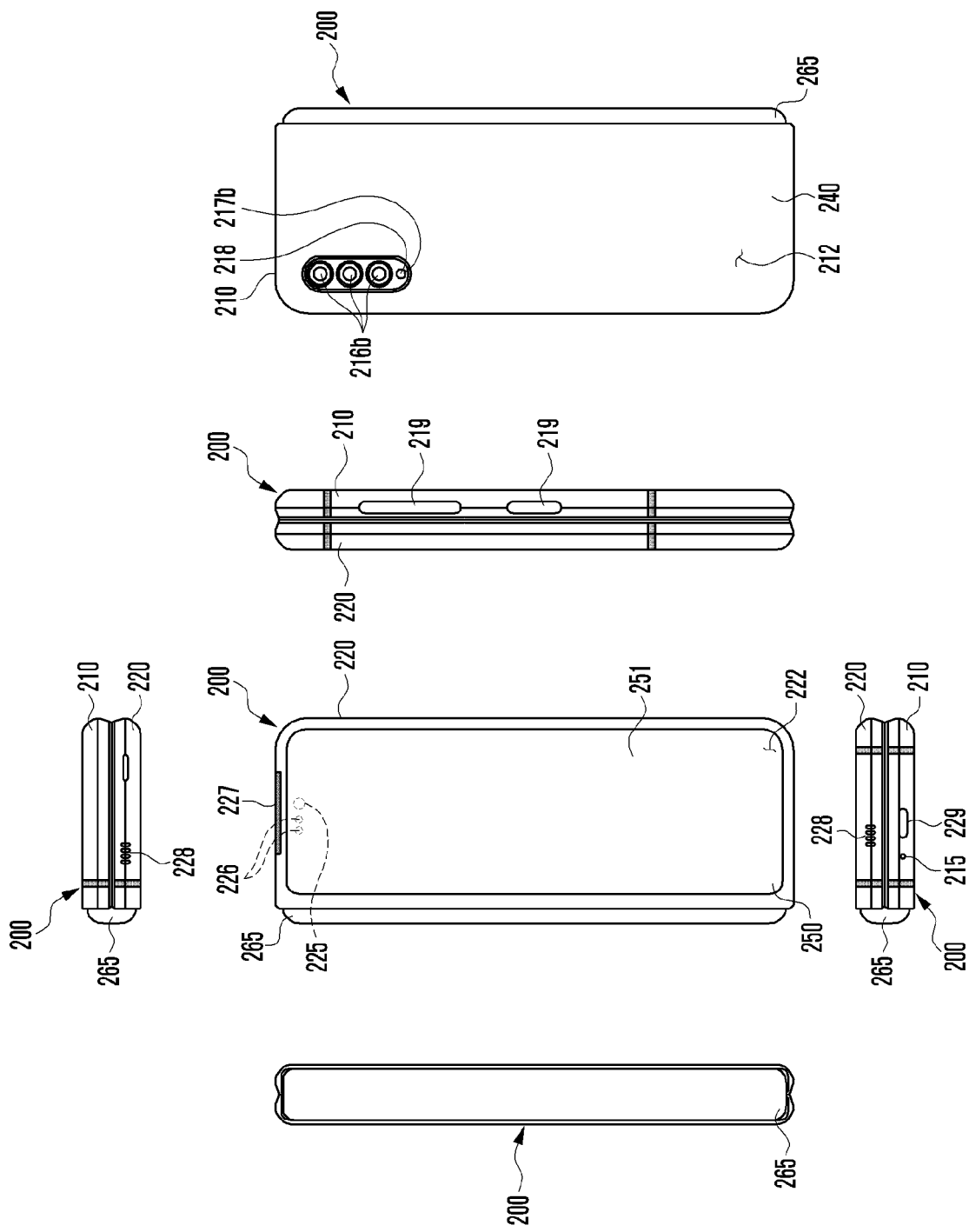
FIG. 3 illustrates a folded state of the electronic device in FIG. 2 according to an embodiment of the disclosure.

FIG. 3 illustrates the folded state of the electronic device 200 in FIG. 2 according to an embodiment of the disclosure.

Referring to FIGS. 2 and 3, the electronic device 200 may include a pair of housings 210 and 220 (e.g., foldable housings) coupled to each other to be rotatable about a folding axis A1 through a hinge module (not shown) so as to be folded toward each other, and a first display 230 (e.g., a flexible display, a foldable display, or a main display) and a second display 251 (e.g., a sub-display) disposed through the pair of housings 210 and 220. According to an embodiment, the hinge module may be disposed so as not to be viewed from outside through a first housing 210 and a second housing 220 while being folded, and may be disposed so as to protect the hinge module, while being unfolded, and not to be viewed from outside through a hinge cover 265 configured to cover a foldable part. In various embodiments of the disclosure, a surface on which the first display 230 is disposed may be defined as the front surface of the electronic device 200, and the opposite surface to the front surface may be defined as the rear surface of the electronic device 200. Furthermore, a surface surrounding the space between the front surface and the rear surface may be defined as the side surface of the electronic device 200.

According to various embodiments, the pair of housings 210 and 220 may include the first housing 210 and the second housing 220, which are disposed to be foldable toward each other through the hinge module. According to an embodiment, the pair of housings 210 and 220 are not limited to the type or coupling illustrated in FIGS. 2 and 3, and may also be implemented by other shapes or a combination and/or coupling of components. According to an embodiment, the first housing 210 and the second housing 220 may be disposed at opposite sides about a folding axis A1, and may have shapes which are overall symmetric with respect to the folding axis A1. According to an embodiment, the first housing 210 and the second housing 220 may be asymmetrically folded with reference to the folding axis A1. According to an embodiment, the angle or distance formed by the first housing 210 and the second housing 220 may vary depending on whether the electronic device 200 is in an unfolded state (e.g., a first state), is in a folded state (e.g., a second state), or is in an intermediate state (e.g., a third state).

According to various embodiments, the first housing 210 may be connected to the hinge module while the electronic device 200 is in the unfolded state, and may include a first surface 211 disposed to face the front surface of the electronic device 200, a second surface 212 facing a direction opposite to the direction faced by the first surface 211, and a first side member 213 at least partially surrounding a first space between the first surface 211 and the second surface 212. According to an embodiment, in the unfolded state of the electronic device 200, the second housing 220 may be connected to the hinge module, and may include a third surface 221 disposed to face the front surface of the electronic device 200, a fourth surface 222 facing a direction opposite to the direction faced by the third surface 221, and a second side member 223 at least partially surrounding a second space between the third surface 221 and the fourth surface 222. According to an embodiment, the first surface 211 may face the same direction as the third surface 221 in the unfolded state, and may face the third surface 221 in the folded state. According to an embodiment, the electronic device 200 may include a recess 201 formed to receive the first display 230 through a structural coupling of the first housing 210 and the second housing 220. According to an embodiment, the recess 201 may have substantially the same size as the first display 230.

According to various embodiments, the hinge cover 265 may be disposed between the first housing 210 and the second housing 220 so as to cover the hinge module. According to an embodiment, depending on the unfolded state, folded state, or intermediate state of the electronic device 200, the hinge cover 265 may be covered by a part of the first housing 210 and the second housing 220 or may be exposed outside. For example, when the electronic device 200 is in the unfolded state, the hinge cover 265 may be covered by the first housing 210 and the second housing 220, and thus may not be exposed. According to an embodiment, when the electronic device 200 is in the folded state, the hinge cover 265 may be exposed outside between the first housing 210 and the second housing 220. According to an embodiment, in the intermediate state in which the first housing 210 and the second housing 220 form a predetermined angle (are folded with a certain angle), the hinge cover 265 may be at least partially exposed outside the electronic device 200 between the first housing 210 and the second housing 220. For example, an area of the hinge cover 265, which is exposed outside, may be smaller than that in a completely folded state. According to an embodiment, the hinge cover 265 may include a curved surface.

According to various embodiments, when the electronic device 200 is in the unfolded state (e.g., the state in FIG. 2), the first housing 210 and the second housing 220 form an angle of about 180 degree, and a first area 230a, a folding area 230c, and a second area 230b of the first display 230 form an identical plane, and may be placed to face the same direction. In another embodiment, when the electronic device 200 is in the unfolded state, the first housing 210 may rotate by an angle of 360 degrees with respect to the second housing 220 to be reversely folded such that the second surface 212 faces the fourth surface 222 (out folding method).

According to various embodiments, when the electronic device 200 is in the folded state (e.g., the state in FIG. 3), the first surface 211 of the first housing 210 and the third surface 221 of the second housing 220 may be placed to face each other. In this case, the first area 230a and the second area 230b of the first display 230 may form a narrow angle (e.g., a range of 0 degrees-about 10 degrees) therebetween through the folding area 230c, and may be placed to face each other. According to an embodiment, the folding area 230c may be at least partially formed as a curved surface having a predetermined curvature radius. According to an embodiment, when the electronic device 200 is in the intermediate state, the first housing 210 and the second housing 220 may be placed with a predetermined angle (a certain angle). In this case, the first area 230a and the second area 230b of the first display 230 may form an angle which is larger than that in the folded state and smaller than that in the unfolded state, and the curvature radius of the folding area 230c may be larger than that in the folded state. In an embodiment, the first housing 210 and the second housing 220 may form, through the hinge module, an angle at which the same can stop at a folding angle between the folded state and the unfolded state (a free stop function). In an embodiment, the first housing 210 and the second housing 220 may operate while receiving pressure applied in a direction of being unfolded or in a direction of being folded, through the hinge module, with reference to a designated inflection angle.

According to various embodiments, the electronic device 200 may include at least one among at least one display 230 or 251, an input device 215, sound output devices 227 and 228, sensor modules 217a, 217b, and 226, camera modules 216a, 216b, and 225, key input devices 219, an indicator (not shown), or a connector port 229, which are disposed in the first housing 210 and/or the second housing 220. In an embodiment, the electronic device 200 may omit at least one of the elements, or may additionally include at least one other element.

According to various embodiments, the at least one display 230 or 251 may include a first display 230 (e.g., a flexible display) disposed to receive support of the third surface 221 of the second housing 220 through the hinge module from the first surface 211 of the first housing 210, and a second display 251 disposed to be viewable from outside through the fourth surface 222 in the inner space of the second housing 220. According to an embodiment, the first display 230 may be mainly used in the unfolded state of the electronic device 200, and the second display 251 may be mainly used in the folded state of the electronic device 200. According to an embodiment, in the case of the intermediate state, the electronic device 200 may use the first display 230 or the second display 251, based on the folding angle of the first housing 210 and the second housing 220.

According to various embodiments, the first display 230 may be disposed in a space formed by the pair of housings 210 and 220. For example, the first display 230 may be seated in the recess 201 formed by the pair of housings 210 and 220, and may be disposed to occupy substantially most of the front surface of the electronic device 200. According to an embodiment, the first display 230 may include a flexible display having at least a partial area deformable as a flat surface or a curved surface. According to an embodiment, the first display 230 may include the first area 230a facing the first housing 210, the second area 230b facing the second housing 220, and the folding area 230c which connects the first area 230a to the second area 230b and faces the hinge module.

According to an embodiment, the first area 230a of the first display 230 may form, substantially, the first surface 211 of the first housing 210. According to an embodiment, the second area 230b of the first display 230 may form, substantially, the third surface 221 of the second housing 220.

According to an embodiment, the division of area of the first display 230 is merely a physical division by the pair of housings 210 and 220 and the hinge module, and, substantially, the first display 230 may be displayed as a seamless single full screen through the pair of housings 210 and 220 and the hinge module. According to an embodiment, the first area 230a and the second area 230b may have overall symmetric shapes with reference to the folding area 230c, or may have partially asymmetric shapes.

Although not illustrated, according to various embodiments, the electronic device 200 may include multiple hinge modules and/or multiple folding areas 230c. For example, the electronic device 200 may include two hinge modules and two folding areas (not shown) corresponding to the two hinge modules (not shown), respectively. In this case, the electronic device 200 may be folded in an alphabet Z shape. For example, the electronic device 200 may include three hinge modules (not shown) and three folding areas (not shown) corresponding to the three hinge modules (not shown), respectively. In this case, the electronic device 200 may be folded in an alphabet W shape.

According to various embodiments, the electronic device 200 may include a first rear cover 240, disposed on the second surface 212 of the first housing 210, and a second rear cover 250, disposed on the fourth surface 222 of the second housing 220. In an embodiment, at least a part of the first rear cover 240 may be formed integrally with the first side member 213. In an embodiment, at least a part of the second rear cover 250 may be formed integrally with the second side member 223. According to an embodiment, at least one of the first rear cover 240 and the second rear cover 250 may be formed of substantially transparent plates (e.g., a polymer plate or a glass plate including various coating layers) or an opaque plate. According to an embodiment, the first rear cover 240 may be formed of an opaque plate made of, for example, coated or colored glass, ceramic, polymer, metal (e.g., aluminum, stainless steel (STS), or magnesium), or a combination of at least two of the materials. According to an embodiment, the second rear cover 250 may be formed of a substantially transparent plate made of, for example, glass or polymer. Therefore, the second display 251 may be disposed to be viewable from outside through the second rear cover 250 in the inner space of the second housing 220.

According to various embodiments, the input device 215 may include a microphone 215. In an embodiment, the input device 215 may include multiple microphones 215 disposed to sense the direction of sound. According to an embodiment, the sound output devices 227 and 228 may include speakers 227 and 228. According to an embodiment, the speakers 227 and 228 may include a call receiver (i.e., speaker 227) disposed through the fourth surface 222 of the second housing 220, and an outer speaker 228 disposed through the side member of the second housing 220. In an embodiment, the microphone 215, the speakers 227 and 228, and the connector port 229 may be disposed in spaces of the first housing 210 and/or the second housing 220, and may be exposed to an external environment through at least one hole formed in the first housing 210 and/or the second housing 220. In an embodiment, the holes formed in the first housing 210 and/or the second housing 220 may be commonly used for the microphone 215 and the speakers 227 and 228. In an embodiment, the sound output devices 227 and 228 may include a speaker (e.g., a piezo speaker) operated without any hole formed in the first housing 210 and/or the second housing 220.

According to various embodiments, the camera modules 216a, 216b, and 225 may include a first camera device 216a disposed on the first surface 211 of the first housing 210, a third camera device 216b disposed on the second surface 212 of the first housing 210, and/or a second camera device 225 disposed in the fourth surface 222 of the second housing 220. According to an embodiment, the electronic device 200 may include a flash 218 disposed near the third camera device 216b. According to an embodiment, the flash 218 may include, for example, a light-emitting diode or a xenon lamp. According to an embodiment, the camera devices 216a, 216b, and 225 may include one lens or multiple lenses, an image sensor, and/or an image signal processor. In an embodiment, at least one camera device among the camera devices 216a, 216b, and 225 may include at least two lenses (wide-angle and telephoto lenses) and image sensors, and may be disposed together on one surface of the first housing 210 and/or the second housing 220.

According to various embodiments, at least one camera device (e.g., the first camera device 216a) among the camera devices 216a, 216b, and 225 may be disposed under the display area of a display (e.g., the first display 230), and thus may not be visually viewable from outside. In this case, the at least one camera device (e.g., the first camera device 216a) may acquire an image an external subject, based on reception of light having passed through the display area of the display (e.g., the first display 230), and may be called an under-display camera (UDC) or an under-panel camera (UPC).

According to various embodiments, at least one camera device (e.g., the second camera device 225) among the camera devices 216a, 216b, and 225 may be disposed to be visually viewable from outside through an opening (e.g., a punch hole) formed by punching a part of a display (e.g., the second display 251).

According to various embodiments, the sensor modules 217a, 217b, and 226 may generate an electrical signal or data value, which corresponds to an operation state inside the electronic device 200 or an environmental state outside the electronic device 200. According to an embodiment, the sensor modules 217a, 217b, and 226 may include a first sensor module 217a disposed in the first surface 211 of the first housing 210, a second sensor module 217b disposed on the second surface 212 of the first housing 210, and/or a third sensor module 226 disposed in the fourth surface 222 of the second housing 220. In an embodiment, the sensor modules 217a, 217b, and 226 may include at least one of a gesture sensor, a grip sensor, a color sensor, an infrared (IR) sensor, an illuminance sensor, an ultrasonic sensor, an iris recognition sensor, or a distance detection sensor (a time of flight (TOF) sensor or a light detection and ranging (LiDAR) scanner).

According to various embodiments, the electronic device 200 may further include at least one of unillustrated sensor modules, for example, a barometric pressure sensor, a magnetic sensor, a biosensor, a temperature sensor, a humidity sensor, or a fingerprint recognition sensor. In an embodiment, the fingerprint recognition sensor may be disposed through at least one side member among the first side member 213 of the first housing 210 and/or the second side member 223 of the second housing 220.

According to various embodiments, the key input devices 219 may be disposed to be exposed outside through the first side member 213 of the first housing 210. In an embodiment, the key input devices 219 may also be disposed to be exposed outside through the second side member 223 of the second housing 220. In an embodiment, the electronic device 200 may not include some or all of the above-described key input devices 219, and the key input device 219, which is not included therein, may be implemented in another form, such as a soft key, on the at least one display 230 or 251. In another embodiment, the key input device 219 may be implemented using a pressure sensor included in the at least one display 230 or 251.

According to various embodiments, the connector port 229 may receive a connector (for example, a USB connector or an interface connector port module (IF module)) for transmitting or receiving power and/or data to or from the external electronic device 101. In an embodiment, the connector port 229 may also perform a function of transmitting or receiving an audio signal to or from the external electronic device 101, or a separate connector port (e.g., an ear jack hole) for performing an audio signal transmission/reception function may be further included.

An electronic device (e.g., the electronic device 101 in FIG. 1) according to various embodiments may include a first camera device (e.g., the first camera device 216a in FIG. 2) having a first characteristic, a second camera device (e.g., the second camera device 225 in FIG. 2) having a second characteristic different from the first characteristic, a memory (e.g., the memory 130 in FIG. 1), and a processor (e.g., the processor 120 in FIG. 1) operatively connected to the first camera device 216a, the second camera device 225, and the memory 130, wherein the memory 130 stores instructions which, when being executed, cause the processor 120 to receive a request for registration of face information through the first camera device 216a, acquire, based on the request, multiple first images (e.g., multiple first images 920 in FIG. 9) through the first camera device 216a, perform filtering for each of the multiple first images 920 to generate multiple second images (e.g., multiple second images 910 in FIG. 9) reflecting the second characteristic of the second camera device 225, generate multiple first templates (e.g., multiple first templates 930 in FIG. 9) based on the multiple first images 920, generate multiple second templates (e.g., multiple second templates 940 in FIG. 9) based on the multiple second images 910, and store the multiple first templates 930 and the multiple second templates 940 in the memory 130, thereby completing the registration of the face information.

According to an embodiment, the memory 130 may include a first template repository (e.g., the first template repository 413 in FIG. 4) configured to correspond to the first camera device 216a, and a second template repository (e.g., the second template repository 414 in FIG. 4) configured to correspond to the second camera device 225, and the first template repository 413 and the second template repository 414 may be separate from each other in terms of hardware or software.

According to an embodiment, the first template repository 413 may store the multiple first templates 930 and the multiple second templates 940, wherein the multiple first templates 930 has priority applied thereto and are thus arranged to precede the multiple second templates 940 in the sort order. The second template repository 414 may store the multiple first templates 930 and the multiple second templates 940, wherein the multiple second templates 940 has priority applied thereto, and are thus arranged to precede the multiple first templates 930 in the sort order.

According to an embodiment, the first camera device 216a may be a UDC disposed under the display area of a first display of the electronic device 101, and the second camera device 225 may be a camera device disposed at a part of a second display of the electronic device 101 or around the second display.

According to an embodiment, the processor 120 may receive a face authentication request through the second camera device 225 after completing the registration of the face information, may compare, based on the face authentication request, the multiple first templates 930 and the multiple second templates 940, stored in the second template repository 414, with an image acquired through the second camera device 225, and may determine, based on the comparison result, whether to perform face authentication.

According to an embodiment, the processor 120 may perform an operation of optimizing each of the multiple first templates 930 and each of the multiple second templates 940 after completing the registration of the face information, and, as the optimization operation, may display a screen requesting a user to capture a face image again through a user interface, may calculate the degree of similarity of the face image of the user, captured through the first camera device 216a, and a first template designated among the multiple first templates 930, and when the degree of similarity of the designated first template has a value smaller than a designated reference value, may delete the designated first template and a second template which is designated among the multiple second templates 940 and forms a pair with the designated first template.

According to an embodiment, the electronic device may further include a first housing, a second housing, and a hinge module disposed between the first housing and the second housing, wherein the first display is disposed to extend from a part of the first housing to the second housing, and the second display is disposed to face a direction opposite to a direction faced by the first display in an unfolded state in which the first housing and the second housing are placed parallel to each other.

According to an embodiment, the first camera device 216a may capture an image by receiving light having passed through at least a part of the first display, and the second camera device 225 may be disposed to face a direction identical to the direction faced by the second display.

According to an embodiment, the processor 120 may receive a face authentication request after completing the registration of the face information, may determine, based on the face authentication request, whether the electronic device 101 is in the unfolded state or is in a folded state in which the first housing and the second housing face each other, may perform face authentication based on acquiring a face image through the first camera device 216a when the electronic device 101 is in the unfolded state, and may perform authentication based on acquiring a face image through the second camera device 225 when the electronic device 101 is in the folded state.

According to an embodiment, the processor 120 may receive a request for registration of face information through the second camera device 225, may acquire, based on the request, multiple second images 910 through the second camera device 225, may perform filtering for each of the multiple second images 910 to generate multiple first images 920 reflecting the first characteristic of the first camera device 216a, may generate multiple first templates 930, based on the multiple first images 920, may generate multiple second templates 940, based on the multiple second images 910, and may store the multiple first templates 930 and the multiple second templates 940 in the memory 130, thereby completing the registration of the face information.

According to various embodiments, a method of an electronic device 101 including a memory 130, a first camera device 216a having a first characteristic, and a second camera device 225 having a second characteristic different from the first characteristic may include an operation of receiving a request for registration of face information through the first camera device 216a, an operation of acquiring, based on the request, multiple first images 920 through the first camera device 216a, an operation of performing filtering for each of the multiple first images 920 to generate multiple second images 910 reflecting the second characteristic of the second camera device 225, an operation of generating multiple first templates 930 based on the multiple first images 920, an operation of generating multiple second templates 940 based on the multiple second images 910, and an operation of storing the multiple first templates 930 and the multiple second templates 940 in the memory 130, thereby completing the registration of the face information.

According to an embodiment, the memory 130 may include a first template repository 413 configured to correspond to the first camera device 216a, and a second template repository 414 configured to correspond to the second camera device 225, and the first template repository 413 and the second template repository 414 may be separate from each other in terms of hardware or software.

According to an embodiment, the method may further include an operation of storing the multiple first templates 930 and the multiple second templates 940 in the first template repository 413, wherein the multiple first templates 930 has priority applied thereto and are thus arranged to precede the multiple second templates 940 in the sort order, and an operation of storing the multiple first templates 930 and the multiple second templates 940 in the second template repository 414, wherein the multiple second templates 940 have priority applied thereto, and are thus arranged to precede the multiple first templates 930 in the sort order.

According to an embodiment, the first camera device 216a may be a UDC disposed under the display area of a first display of the electronic device 101, and the second camera device 225 may be a camera device disposed at a part of a second display of the electronic device 101 or around the second display.

According to an embodiment, the method may further include an operation of receiving a face authentication request through the second camera device 225 after completing the registration of the face information, an operation of comparing, based on the face authentication request, the multiple first templates 930 and the multiple second templates 940, stored in the second template repository 414, with an image acquired through the second camera device 225, and an operation of determining, based on the comparison result, whether to perform face authentication.

According to an embodiment, the method may further include an operation of optimizing each of the multiple first templates 930 and each of the multiple second templates 940 after completing the registration of the face information. The optimization operation may include an operation of displaying a screen requesting a user to capture a face image again through a user interface, an operation of calculating the degree of similarity of the face image of the user, captured through the first camera device 216a, and a first template designated among the multiple first templates 930, and an operation of deleting the designated first template and a second template, which is designated among the multiple second templates 940 and forms a pair with the designated first template, when the degree of similarity of the designated first template has a value smaller than a designated reference value.

According to an embodiment, the electronic device 101 may further include a first housing, a second housing, and a hinge module disposed between the first housing and the second housing, wherein the first display is disposed to extend from a part of the first housing to the second housing, and the second display is disposed to face a direction opposite to a direction faced by the first display in an unfolded state in which the first housing and the second housing are placed parallel to each other.

According to an embodiment, the method may further include an operation of capturing an image by the first camera device 216a through reception of light having passed through at least a part of the first display, wherein the second camera device 225 is disposed to face a direction identical to the direction faced by the second display.

According to an embodiment, the method may further include an operation of receiving a face authentication request after completing the registration of the face information, an operation of determining, based on the face authentication request, whether the electronic device 101 is in the unfolded state or is in a folded state in which the first housing and the second housing face each other, an operation of performing face authentication based on acquiring a face image through the first camera device 216a when the electronic device 101 is in the unfolded state, and an operation of performing authentication based on acquiring a face image through the second camera device 225 when the electronic device 101 is in the folded state.

According to an embodiment, the method may further include an operation of receiving a request for registration of face information through the second camera device 225, an operation of acquiring, based on the request, multiple second images 910 through the second camera device 225, an operation of performing filtering for each of the multiple second images 910 to generate multiple first images 920 reflecting the first characteristic of the first camera device 216a, an operation of generating multiple first templates 930, based on the multiple first images 920, an operation of generating multiple second templates 940, based on the multiple second images 910, and an operation storing the multiple first templates 930 and the multiple second templates 940 in the memory 130, thereby completing the registration of the face information.

Figure 4:
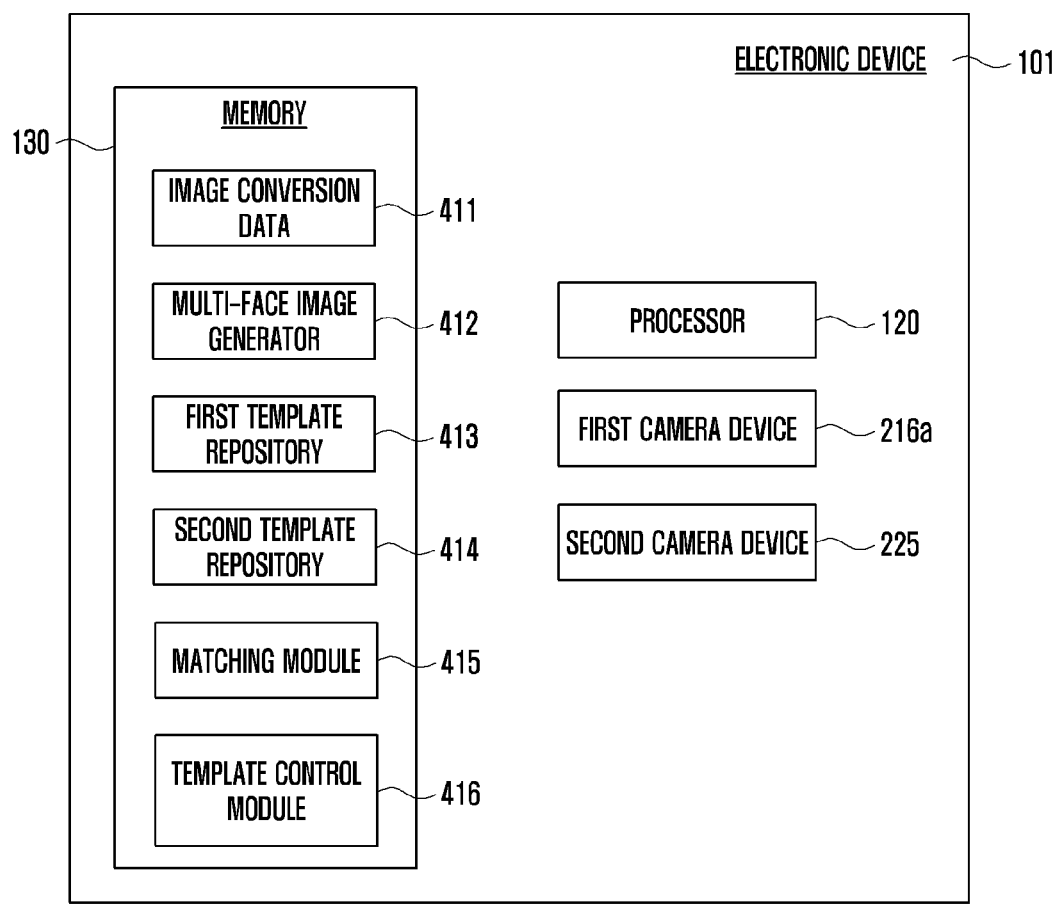
FIG. 4 is a block diagram of an electronic device according to an embodiment of the disclosure.

FIG. 4 is a block diagram of an electronic device according to an embodiment of the disclosure.

The electronic device 101 illustrated in FIG. 4 may be at least partially similar to the electronic device 101 illustrated in FIG. 1, or may include another embodiment.

The electronic device 101 illustrated in FIG. 4 may be at least partially similar to the electronic device 200 illustrated in FIGS. 2 and 3, or may include another embodiment.

Referring to FIG. 4, the electronic device 101 according to an embodiment may include a processor 120, a first camera device 216a, a second camera device 225, and a memory (e.g., the memory 130 in FIG. 1).

The embodiment of the disclosure discloses that the first camera device 216a may be an under-display camera (UDC) or an under panel camera (UPC) and that the second camera device 225 may be a hole-in display (HID) camera. However, this is only one example, and may not be limited. For example, the types of the first camera device 216a and the second camera device 225 do not matter if the same are cameras having different characteristics.

According to an embodiment, the first camera device 216a may be the first camera device 216a described with reference to FIGS. 2 and 3. For example, the first camera device 216a may be a camera device disposed on at least a part of a first display (e.g., the first display 230 in FIG. 2) or around the first display 230 such that a user can perform selfie image capturing while looking at the first display 230. According to an embodiment, the first camera device 216a may be an under-display camera (UDC) or an under panel camera (UPC) disposed under the display area of a display (e.g., the first display 230).

According to an embodiment, the second camera device 225 may be the second camera device 225 described with reference to FIGS. 2 and 3. For example, the second camera device 225 may be a camera device disposed on at least a part of a second display (e.g., the second display 251 in FIG. 2) or around the second display 251 such that the user can perform selfie image capturing while looking at the second display 251. According to an embodiment, the second camera device 225 may be disposed to be visually viewable from outside through an opening (e.g., a punch hole) formed by punching a part of the second display 251.

According to an embodiment, the processor 120 may acquire image data through the first camera device 216*a* and/or the second camera device 225.

According to an embodiment, the processor 120 may generate multiple first templates (e.g., the multiple first templates 930 in FIG. 10) and multiple second templates (e.g., the multiple second templates 940 in FIG. 10) for face authentication, based on a first image (e.g., the first image 920 in FIG. 10) acquired from the first camera device 216*a*. According to an embodiment, the processor 120 may generate multiple first templates 930 and multiple second templates 940 for face authentication, based on a second image (e.g., the second image 910 in FIG. 9)) acquired from the second camera device 225.

According to an embodiment, the processor 120 may receive a face authentication request after performing an operation of generating the multiple first and second templates 930 and 940. According to an embodiment, the processor 120 may acquire a face image of a user by using the first camera device 216*a* or the second camera device 225 in response to the face authentication request, and may perform face authentication based on comparing the acquired face image with the multiple first and second templates 930 and 940.

According to an embodiment, in performing the face authentication, the processor 120 may compare the face image with the multiple first and second templates 930 and 940, based on a priority corresponding to the type of a camera device which has captured the face image. For example, when the camera device, which has captured the face image, is the first camera device 216*a*, the processor 120 may configure priorities with respect to the multiple first templates 930 corresponding to the first camera device 216*a* among the multiple first and second templates 930 and 940. For example, when the camera device, which has captured the face image, is the second camera device 225, the processor 120 may configure priorities with respect to the multiple second templates 940 corresponding to the second camera device 225 among the multiple first and second templates 930 and 940. The priorities may imply the order of templates compared with the face image. For example, the processor 120 may first compare the face image with a template having a relatively high priority, and subsequently compare the face image with a template having a relatively low priority.

According to an embodiment, the processor 120 may update, based on the result of the face authentication, a matching score (e.g., a matching score 1301 in FIG. 13) for each of the multiple first and second templates 930 and 940 used for the face authentication. For example, the processor 120 may reduce the matching score 1301 with respect to a template which has failed in the face authentication among the multiple first and second templates 930 and 940. For example, the processor 120 may increase the matching score 1301 with respect to a template which has succeeded in the face authentication among the multiple first and second templates 930 and 940.

According to an embodiment, the processor 120 may change, based on the result of the face authentication, priorities of templates configured to correspond to the first camera device 216*a*. For example, when the camera device that has captured the face image is the first camera device 216*a*, the multiple first templates 930, corresponding to the first camera device 216*a* among the multiple first and second templates 930 and 940, may be configured to have priority, but a second template designated based on the result of performing the face authentication may be configured to have priority over the multiple first templates 930. For example, when the camera device that has captured the face image is the second camera device 225, the multiple second templates 940, corresponding to the second camera device 225 among the multiple first and second templates 930 and 940, may be configured to have priority, but a first template designated based on the result of performing the face authentication may be configured to have priority over the multiple second templates 940.

According to an embodiment, the processor 120 may provide a secure execution environment having a relatively high level of security through the memory 130. For example, the electronic device 101 may operate a normal execution environment and a secure execution environment. According to an embodiment, the normal execution environment may be called a rich execution environment (REE), and may have a relative low level of security. According to an embodiment, the secure execution environment may be called a trusted execution environment (TEE), and may have a relatively high level of security compared with the normal execution environment. The secure execution environment may include, for example, TrustZone.

According to an embodiment, in the secure execution environment, the electronic device 101 may store data requiring a relatively high security level in a secure environment, and may perform a pertinent operation. The secure execution environment is operated by the processor 120 of the electronic device 101, and may be operated based on a trustable hardware structure determined in the process of manufacturing the electronic device 101. The secure execution environment may partition the processor 120 or the memory 130 into a normal area and a secure area, and may operate the same in the secure area. The electronic device 101 may operate the secure execution environment through a physical change in hardware or a logical change in software. For example, the secure execution environment and the normal execution environment are logically separate memory areas, and may be included in the same memory in terms of hardware.

According to an embodiment, the secure execution environment may operate while being separate from the normal execution environment in terms of hardware or in terms of software in the same hardware.

According to an embodiment, the processor 120 may provide the secure execution environment through the memory 130, and may manage data necessary for face authentication through the secure execution environment. For example, the secure execution environment implemented in the memory 130 by the processor 120 may include an image conversion data 411, a multi-face image generator 412, a first template repository 413, a second template repository 414, a matching module 415, and/or a template control module 416.

According to an embodiment, the image conversion data 411 may include a filter data set calculated based on a difference value corresponding to a characteristic difference of each of multiple camera devices (e.g., the first camera device 216*a* and the second camera device 225) included in the electronic device 101. According to an embodiment, the image conversion data 411 may include at least one piece of conversion filter data. According to an embodiment, the conversion filter data may include at least one first conversion filter for converting a first image captured through the first camera device 216*a* to an image which is substantially identical or similar to a second image captured through the second camera device 225. For example, the processor 120 may apply the first conversion filter to the first image captured through the first camera device 216a, thereby generating an image which is substantially identical or similar to the second image captured through the second camera device 225. According to an embodiment, the conversion filter data may include a second conversion filter for converting the second image captured through the second camera device 225 to an image which is substantially identical or similar to the first image captured through the first camera device 216a. For example, the processor 120 may apply the second conversion filter to the second image captured through the second camera device 225, thereby generating an image which is substantially identical or similar to the first image captured through the first camera device 216a.

According to an embodiment, the multi-face image generator 412 may generate, using the image conversion data 411, multiple images from an image acquired through a designated camera device. The generated multiple images may be images reflecting characteristics of other cameras excluding the designated camera device. According to an embodiment, when the first image captured through the first camera device 216a is input by the processor 120, the multi-face image generator 412 may use the image conversion data 411 (e.g., the first conversion filter) to generate, from the input first image, an image which is substantially identical or similar to the second image captured through the second camera device 225. According to an embodiment, when the second image captured through the second camera device 225 is input by the processor 120, the multi-face image generator 412 may use the image conversion data 411 (e.g., the second conversion filter) to generate, from the input second image, an image which is substantially identical or similar to the first image captured through the first camera device 216a.

According to an embodiment, the first template repository 413 may store multiple templates for performing face authentication through the first camera device 216a. According to an embodiment, the multiple templates stored in the first template repository 413 may include not only the multiple first templates 930 generated based on a characteristic of the first camera device 216a but also at least one second template generated based on a characteristic of the second camera device 225. According to an embodiment, the electronic device 101 may configure first storing and sorting, in the first template repository 413, the multiple first templates 930 generated based on a characteristic of the first camera device 216a. After the above configuration, the electronic device 101 may receive a face authentication request through the first camera device 216a, and, when the face authentication is successfully performed using a designated second template generated based on the characteristic of the second camera device 225 in a face authentication operation, may increase priority and sort order of the designated second template in the first template repository 413.

According to an embodiment, the second template repository 414 may store multiple templates for performing face authentication through the second camera device 225. According to an embodiment, the multiple templates stored in the second template repository 414 may include not only the multiple second templates 940 generated based on the characteristic of the second camera device 225 but also at least one first template generated based on the characteristic of the first camera device 216a. According to an embodiment, the electronic device 101 may configure first storing and sorting, in the second template repository 414, the multiple second templates 940 generated based on a characteristic of the second camera device 225. After the above configuration, the electronic device 101 may receive a face authentication request through the second camera device 225, and, when the face authentication is successfully performed using a designated first template generated based on the characteristic of the first camera device 216a in a face authentication operation, may increase the priority or sort order of the designated first template in the second template repository 414.

According to an embodiment, the templates generated in the face information registration operation may be stored according to identification information of each camera device. For example, templates may be stored in the first template repository 413 so as to correspond to face authentication by the first camera device 216a, and the first templates generated based on the characteristic of the first camera device 216a may be first arranged. For example, templates may be stored in the second template repository 414 so as to correspond to face authentication by the second camera device 225, and the second templates generated based on the characteristic of the second camera device 225 may be first arranged.

According to various embodiments, in storing templates, each of the first template repository 413 and the second template repository 414 may include image source information indicating which one among multiple camera devices has generated an image on the basis of which a corresponding template is generated.

According to an embodiment, when a face authentication request is received by the processor 120, the matching module 415 may compare the face image acquired through the designated camera device with multiple templates with reference to the first template repository 413 or the second template repository 414, and may determine, based on the comparison result, whether to perform face authentication. For example, when a face authentication request through the first camera device 216a is received, the matching module 415 may compare, based on the request, multiple templates stored in the first template repository 413 with a face image acquired through the first camera device 216a, and may determine, based on the comparison result, whether to perform the face authentication. For example, when a face authentication request is received through the second camera device 225, the matching module 415 may compare, based on the request, multiple templates stored in the second template repository 414 with a face image acquired through the second camera device 225, and may determine, based on the comparison result, whether to perform the face authentication.

According to an embodiment, the template control module 416 may control, under control of the processor 120, operations related to face authentication. For example, the template control module 416 may control the matching module 415, and may change, based on the result of face authentication by the matching module 415, the priority and sort order of multiple templates stored in the first template repository 413 and/or multiple templates stored in the second template repository 414.

The electronic device 101 according to various embodiments may improve security by performing and managing operations and data related to face authentication in the secure execution environment.

Figure 5:
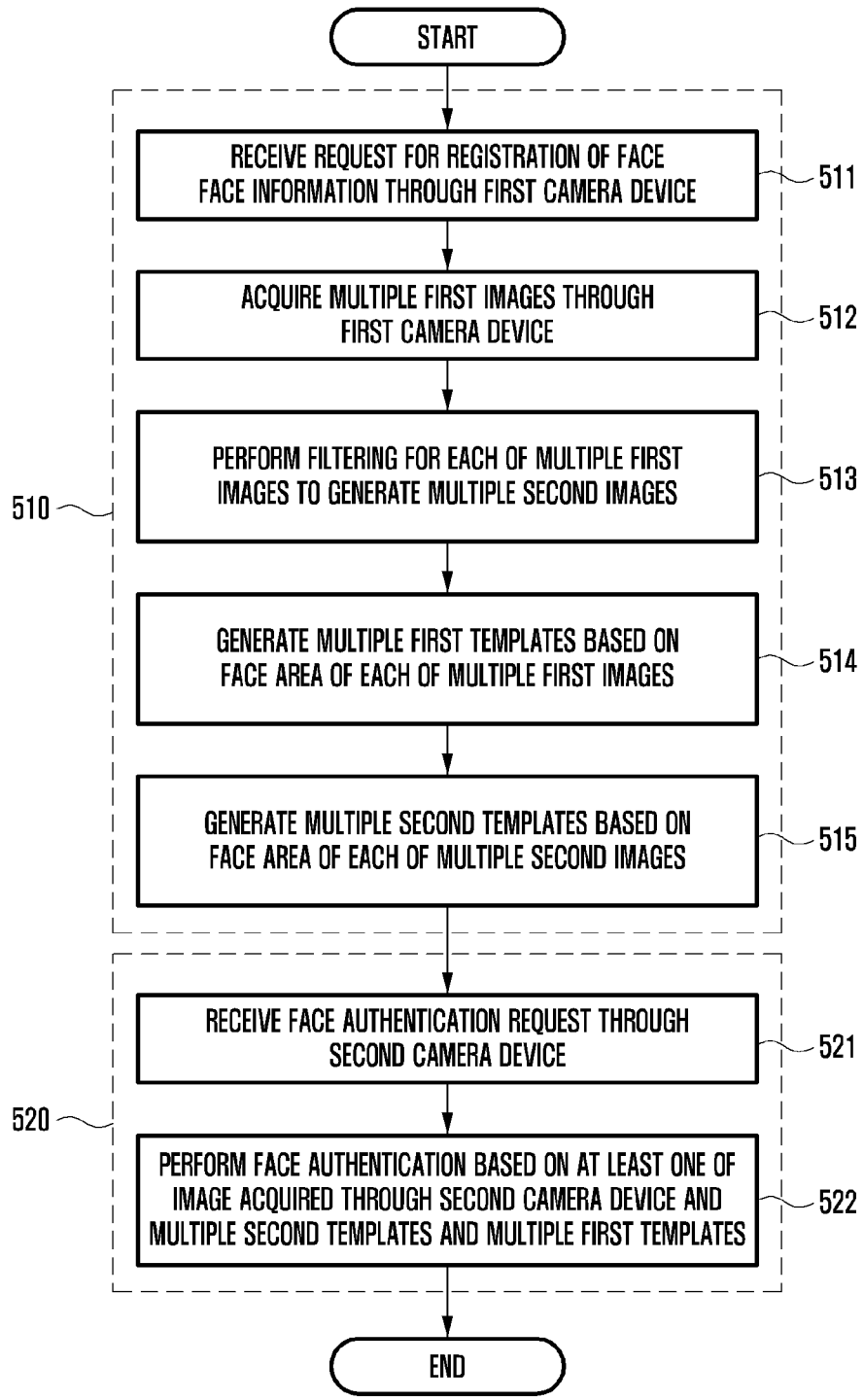
FIG. 5 is a flowchart illustrating operations of an electronic device according to an embodiment of the disclosure.

FIG. 5 is a flowchart illustrating operations of an electronic device 101 according to an embodiment of the disclosure.

At least some of the operations illustrated in FIG. 5 may be omitted. At least some operations described with reference to other drawings according to various embodiments of the disclosure may be added before or after at least some operations illustrated in FIG. 5.

Referring to FIG. 5, the operations illustrated in FIG. 5 may be performed by a processor 120 (e.g., the processor 120 in FIG. 1 or 4). For example, a memory 130 (e.g., the memory 130 in FIG. 1 or 4) of the electronic device 101 may store instructions which, when being executed by the processor 120, cause the electronic device 101 to perform at least some operations illustrated in FIG. 5.

The operations of the electronic device 101 according to various embodiments may include operation 510 for registering face information in the electronic device 101, and operation 520 for performing face authentication by the electronic device 101, based on preregistered face information.

According to an embodiment, operation 510 of the electronic device 101 for registering face information may include the following operations.

In operation 511, the electronic device 101 according to an embodiment may receive a request for registration of face information through the first camera device 216a. For example, as described with reference to FIG. 2, the electronic device 101 may receive a request of registration of face information through the first camera device 216a in an unfolded state of the electronic device 101. In another embodiment, although not illustrated, the electronic device 101 may receive a request for registration of face information through the second camera device 225. For example, as described with reference to FIG. 3, the electronic device 101 may receive a request for registration of face information through the second camera device 225 in a folded state of the electronic device 101. Hereinafter, in various embodiments of the disclosure, an embodiment described with reference to FIG. 5 describes only receiving a face information registration request through the first camera device 216a, but can also be changed into or substituted with receiving a face information registration request through the second camera device 225.

In operation 512, the electronic device 101 according to an embodiment may acquire multiple first images (e.g., the first image 920 in FIG. 10) through the first camera device 216a. For example, in the unfolded state, the electronic device 101 may capture multiple first images 920 including a user's face through the first camera device 216a.

Figure 9:
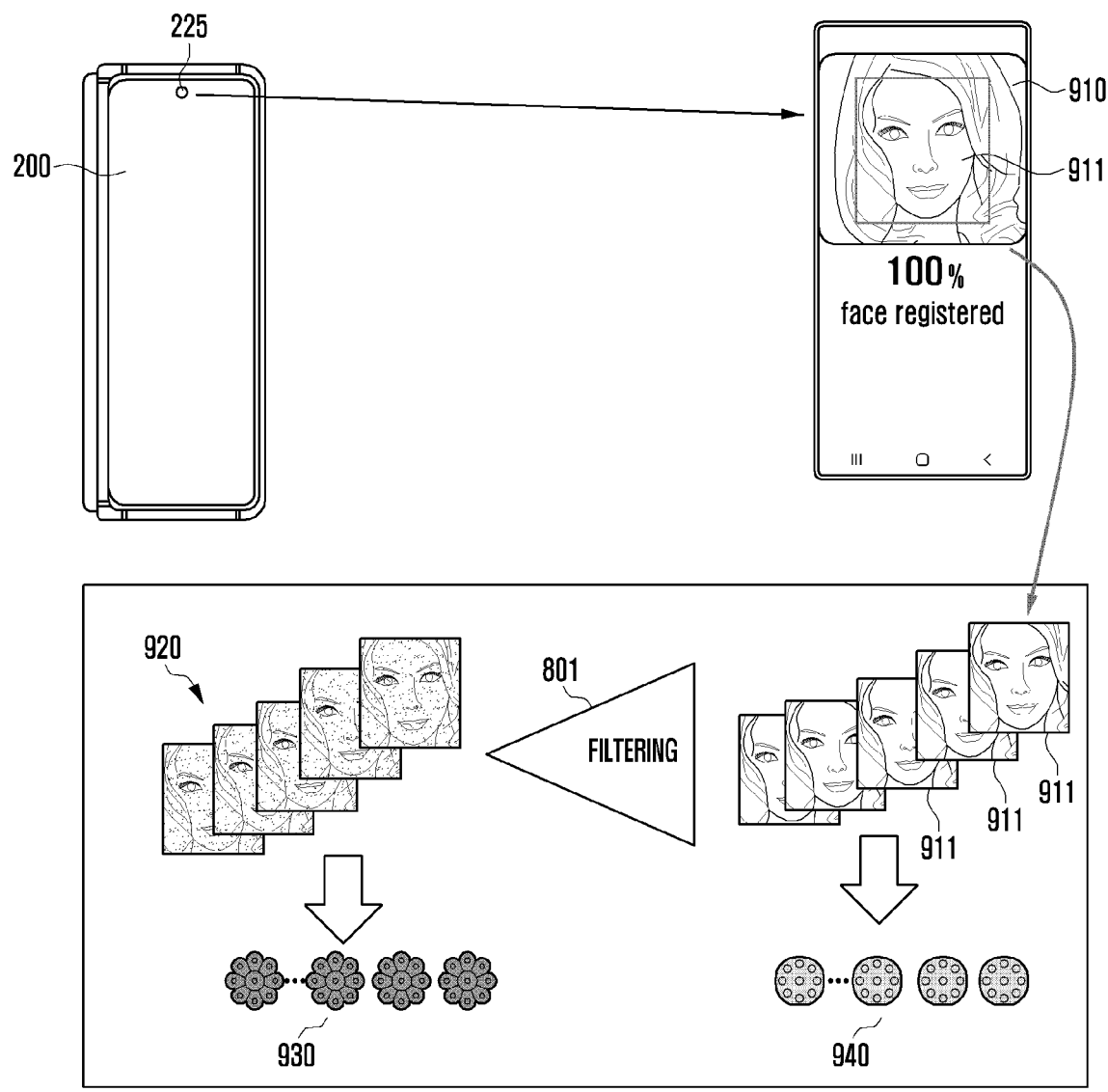
FIG. 9 illustrates an operation in which an electronic device according to an embodiment generates multiple first and second templates by using an image acquired from a second camera device according to an embodiment of the disclosure.
Figure 10:
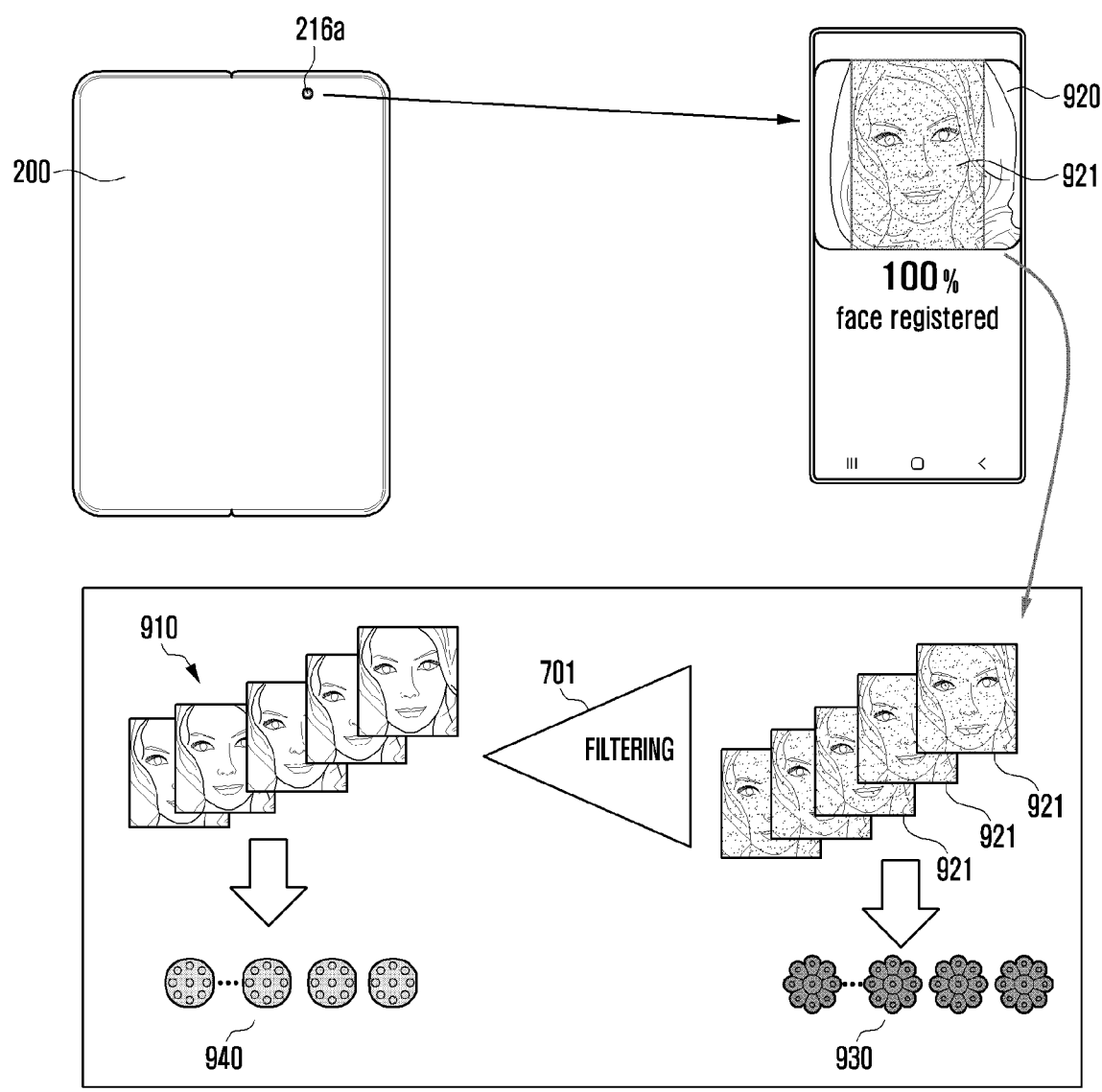
FIG. 10 illustrates an operation in which an electronic device according to an embodiment generates multiple first and second templates by using an image acquired from a first camera device according to an embodiment of the disclosure.

In operation 513, the electronic device 101 according to an embodiment may perform filtering (e.g., the filtering 701 in FIG. 7) for each of the multiple first images 920 to generate multiple second images (e.g., the second images 910 in FIG. 10). According to an embodiment, the electronic device 101 may control the multi-face image generator 412 to generate, using the image conversion data 411, multiple images from an image acquired through a designated camera device. The generated multiple images may be images reflecting characteristics of other camera devices excluding the designated camera device. According to an embodiment, when a first image 920 captured through the first camera device 216a is input by the processor 120, the multi-face image generator 412 may use the image conversion data 411 (e.g., the first conversion filter) to generate, from the input first image 920, a second image 910 substantially identical or similar to an image captured through the second camera device 225. Although not illustrated, according to an embodiment, when a second image (e.g., the second image 910 in FIG. 9) captured through the second camera device 225 is input by the processor 120, the multi-face image generator 412 may use the image conversion data 411 (e.g., the second conversion filter) to generate, from the input second image 910, a first image (e.g., the first image 920 in FIG. 9) substantially identical or similar to an image captured through the first camera device 216a.

In operation 514, the electronic device 101 according to an embodiment may generate multiple first templates 930, based on respective face areas (e.g., the face areas 921 in FIG. 10) of multiple first images (e.g., the first image 920 in FIG. 10). For example, the electronic device 101 may determine a face area from each of the multiple first images, and may generate the multiple first templates 930, based on the determined face area 921. According to an embodiment, the electronic device 101 may store the generated multiple first templates 930 in the first template repository 413 of a secure execution environment.

In operation 515, the electronic device 101 according to an embodiment may generate multiple second templates 940, based on a face area (e.g., the face area 911 in FIG. 9) of each of multiple second images (e.g., the second image 910 in FIG. 9). For example, the electronic device 101 may determine a face area from each of multiple second images 910, and may generate the multiple second templates 940, based on the determined face area 911. According to an embodiment, the electronic device 101 may store the generated multiple second templates 940 in a second template repository (e.g., the second template repository 414 in FIG. 4) of secure execution environment. According to an embodiment, the second template repository 414 may be a repository which is physically separate from the first template repository (e.g., the first template repository 413 in FIG. 4) or separate therefrom in terms of software.

According to an embodiment, operation 520 of the electronic device 101 for performing face authentication may include the following operations. For example, the electronic device 101 according to an embodiment may receive a face authentication request after performing a registration operation such as operation 510, and may perform the following operations in response to the face authentication request.

In operation 521, the electronic device 101 according to an embodiment may receive a face authentication request through the second camera device 225. For example, the electronic device 101 may receive the face authentication request through the second camera device 225 in a folded state of the electronic device 101 as described with reference to FIG. 3. In another embodiment, although not illustrated, the electronic device 101 may receive a face authentication request through the first camera device 216a. For example, the electronic device 101 may receive a face authentication request through the first camera device 216a in an unfolded state of the electronic device 101, as described with reference to FIG. 2. Hereinafter, in various embodiments of the disclosure, an embodiment described with reference with FIG. 5 describes only receiving a face authentication request through the second camera device 225, but may be changed into or substituted with receiving a face authentication request through the first camera device 216a.

In operation 522, the electronic device 101 according to an embodiment may perform face authentication based on at least one of an image acquired through the second camera device 225 and the multiple second templates 940 and the multiple first templates 930. For example, when receiving a face authentication request through the second camera device 225, the electronic device 101 may compare, by controlling the matching module 415, multiple templates stored in the second template repository 414 with a face image acquired through the second camera device 225, and may determine, based on the comparison result, whether to perform face authentication. In the multiple templates stored in the second template repository 414, priority and sort order may be configured with respect to multiple second templates 940 generated based on a characteristic of the second camera device 225, but at least one first template generated based on a characteristic of the first camera device 216a may also be included. This may be, as described above, because the template control module 416 has changed, based on the face authentication result, the priority and sort order of the multiple templates stored in the second template repository 414.

Although not illustrated, when receiving a face authentication request through the first camera device 216a, the electronic device 101 may compare, by controlling the matching module 415, multiple templates stored in the first template repository 413 with a face image acquired through the first camera device 216a, and may determine, based on the comparison result, whether to perform face authentication. In the multiple templets stored in the first template repository 413, priority and sort order may be configured with respect to multiple first templates 930 generated based on the characteristic of the first camera device 216a, but at least one second template generated based on a characteristic of the second camera device 225 may also be included. This may be, as described above, because the template control module 416 has changed, based on the face authentication result, the priority and sort order of the multiple templates stored in the first template repository 413.

Figure 6:
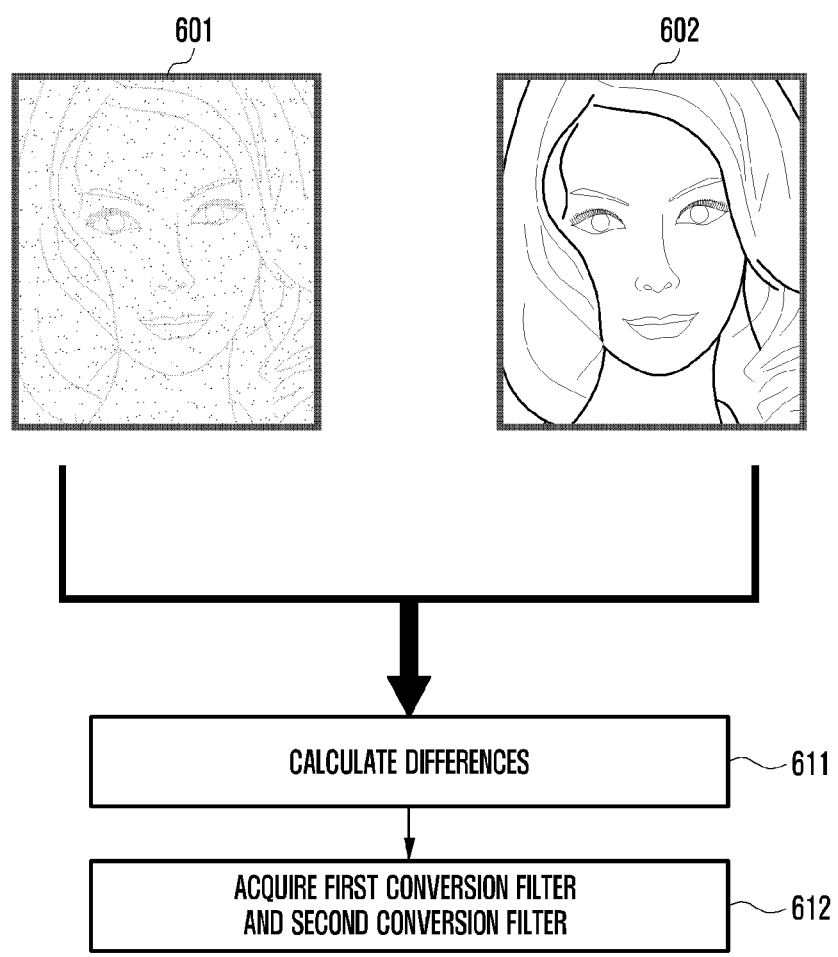
FIG. 6 illustrates an operation of generating a conversion filter according to an embodiment of the disclosure.

FIG. 6 illustrates an operation of generating a conversion filter according to an embodiment of the disclosure.

Figure 7:
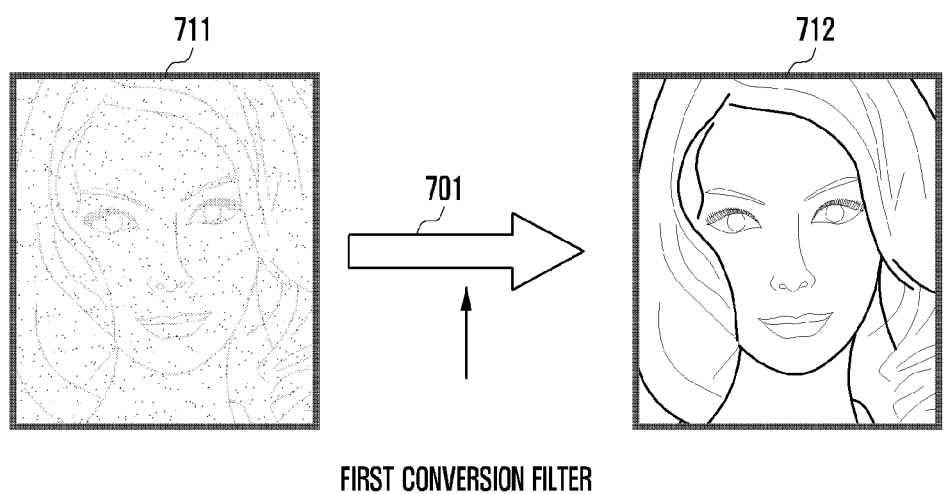
FIG. 7 illustrates an operation of converting an image acquired from a first camera device according to an embodiment of the disclosure.

FIG. 7 illustrates an operation of converting an image acquired from a first camera device according to an embodiment of the disclosure.

Figure 8:
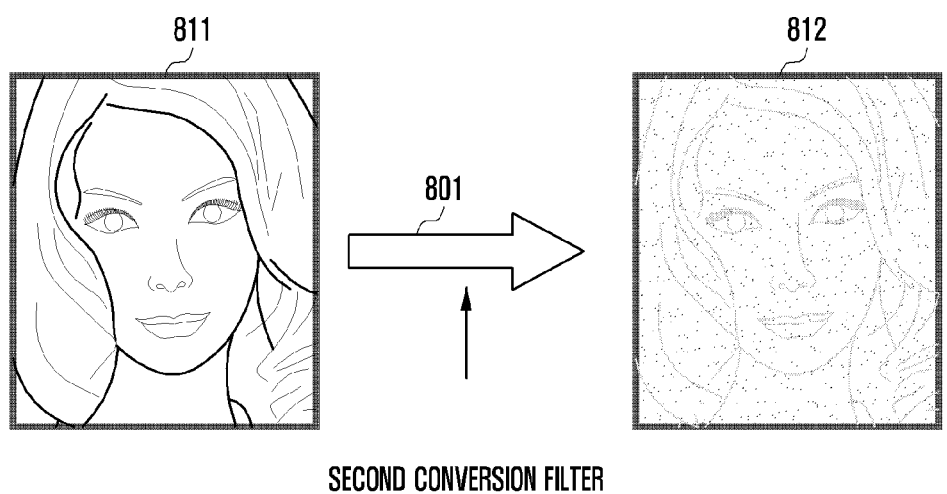
FIG. 8 illustrates an operation of converting an image acquired from a second camera device according to an embodiment of the disclosure.

FIG. 8 illustrates an operation of converting an image acquired from a second camera device 225 according to an embodiment of the disclosure.

According to an embodiment, the electronic device 101 may previously perform an operation of generating and storing a conversion filter before performing operation 510 of the electronic device 101 for registering face information, described with reference to FIG. 5.

Referring to FIG. 6, the electronic device 101 according to an embodiment may acquire multiple first images 601 through the first camera device 216a. For example, a first image 601 may include a face image acquired by imaging a user's face using the first camera device 216a.

According to an embodiment, the electronic device 101 may acquire multiple second images 602 through the second camera device 225. For example, a second image 602 may include a face image acquired by imaging the user's face through the second camera device 225.

According to an embodiment, as in 611 of FIG. 6, the electronic device 101 may compare the multiple first images 601 with the multiple second images 602 to calculate differences between the first images 601 and the second images 602. According to an embodiment, the electronic device 101 may use a deep learning method as a method for calculating differences between the first images 601 and the second images 602. For example, the electronic device 101 may calculate a difference value by comparing a first image 601 and a second image 602, captured in a resolution, an illuminance, and/or a designated light source.

According to an embodiment, as in 612 of FIG. 6, the electronic device 101 may acquire a first conversion filter and a second conversion filter, based on a difference value resulting from performing the deep learning. According to an embodiment, the first conversion filter and the second conversion filter may be used when the electronic device 101 generates templates for each of the first camera device 216a and the second camera device 225. For example, in operation 513 in FIG. 5, the electronic device 101 may use the first conversion filter to generate multiple second images (e.g., the second images 910 in FIG. 10). For example, when performing an operation of registering face information, the electronic device 101 may use the first conversion filter and/or the second conversion filter to not only generate templates corresponding to a characteristic of a camera device which has captured an image but also generate templates corresponding to characteristics of the remaining camera devices excluding the camera device which has captured the image.

According to an embodiment, at the time of performing image capturing through the first camera device 216a and/or the second camera device 225, the electronic device 101 may perform deep learning for images captured in an environment in which various light sources such as a red light source and/or a purple light source emit light, images captured in respective levels of external illuminance environments, and/or images captured in respective resolutions, thereby generating a most appropriate conversion filter.

According to an embodiment, an image captured by a normal camera such as the second camera device 225, may have relatively low noise compared with an image captured by a UDC such as the first camera device 216a. Therefore, the electronic device 101 may generate the first conversion filter capable of reducing noise with respect an image captured by the second camera device 225 and reducing light blurring caused by the dispersion of light according to a characteristic of a display.

Referring to FIG. 7, the electronic device 101 may perform filtering 701 of applying the first conversion filter to a first image 711 captured through the first camera device 216a to acquire a converted image 712 that is substantially identical or similar to an image captured through the second camera device 225. Unlike the first image 711 which is an original image captured through the first camera device 216a, the acquired converted image 712 is an image having less noise and reduced light blurring, and may be substantially identical or similar to the image captured through the second camera device 225.

According to an embodiment, when the electronic device 101 generates, from an original image captured through the first camera device 216a, a converted image substantially identical or similar to an image captured through the second camera device 225, the converted image may be generated by applying a sharpness filter to a part in which a blur phenomenon has been caused by a characteristic of a UDC. According to various embodiments, in generating the first conversion filter, the electronic device 101 may calculate a radius value or a color noise value of a camera device and/or a threshold value through deep learning, and may consider a characteristic of a UDC and/or attributes of a display (e.g., the first display 230) overlapping the UDC.

According to an embodiment, in the case of an image captured by a UDC such as the first camera device 216a, spot blur may be caused. The electronic device 101 may generate a conversion filter, having an effect similar to a bokeh effect, by deep learning considering the characteristic of the UDC. According to an embodiment, the electronic device 101 may generate a conversion filter to which various characteristics are applied based on attributes of a display disposed to overlap the UDC, for example, the first display 230. According to an embodiment, in the case of a UDC such as the first camera device 216*a*, a designated noise may be caused in an image by a physical condition in which received light is needed to pass through a display area of a display. According to an embodiment, the electronic device 101 may generate the second conversion filter by deep learning for the designated noise.

Referring to FIG. 8, the electronic device 101 may perform filtering 801 of applying the second conversion filter to a second image 811 captured through the second camera device 225, thereby acquiring a converted image 812 substantially identical or similar to an image captured through the first camera device 216*a*. Unlike the second image 811 which is an original image captured through the second camera device 225, the acquired converted image 812 is an image having more noise and a light blurring phenomenon intentionally applied thereto, and may be substantially identical or similar to the image captured through the first camera device 216*a*.

FIG. 9 illustrates an operation in which an electronic device according to an embodiment generates multiple first and second templates by using an image acquired from a second camera device according to an embodiment of the disclosure.

Referring to FIG. 9, a request for registration of face information may be received in a folded state of the electronic device 200, as described with reference to FIG. 3. According to an embodiment, the electronic device 200 may activate the second camera device 225 in response to the request, and may acquire at least one second image 910 through the second camera device 225. For example, the second image 910 may include a user's face image self-captured through the second camera device 225 in the folded state of the electronic device 200.

According to an embodiment, the electronic device 200 may determine a face area 911 from the second image 910, and may generate a second template 940, based on the determined face area 911. For example, the electronic device 200 may extract a face image corresponding to the face area 911 of the second image 910, and may generate the second template 940, based on the extracted face image. According to an embodiment, the electronic device 200 may determine a face area 911 from each of multiple second images 910, and may generate multiple second templates 940, based on the determined face area 911.

According to an embodiment, the electronic device 200 may acquire multiple first images 920 by performing filtering (e.g., the filtering 801 in FIG. 8) of applying a second conversion filter to each of the multiple second images 910 in the secure execution environment of the memory 130. The multiple first images 920 are not images directly captured through the first camera device 216*a*. However, the filtering (e.g., the filtering 801 in FIG. 8) may be performed with respect to the multiple second images 910, and thus the multiple first images 920 may be substantially identical or similar to images captured through the first camera device 216*a*.

According to an embodiment, the electronic device 200 may determine face areas from the multiple first images 920, and may generate multiple first templates 930, based on the determined face areas.

According to an embodiment, the electronic device 200 may store the multiple first templates 930 in a first template repository (e.g., the first template repository 413 in FIG. 4), and may store the multiple second templates 940 in a second template repository (e.g., the second template repository 414 in FIG. 4) which is physically separate from the first template repository 413 or separate therefrom in terms of software.

FIG. 10 illustrates an operation in which an electronic device 200 according to an embodiment generates multiple first and second templates 930 and 940 by using an image acquired from a first camera device 216*a* according to an embodiment of the disclosure.

Referring to FIG. 10, a request for registration of face information may be received in an unfolded state of the electronic device 200, as described with reference to FIG. 2. According to an embodiment, the electronic device 200 may activate the first camera device 216*a* in response to the request, and may acquire multiple first images 920 or at least one first image 920 through the first camera device 216*a*. For example, the first image 920 may include a user's face image self-captured through the first camera device 216*a* in the unfolded state of the electronic device 200.

According to an embodiment, the electronic device 200 may determine a face area 921 from the first image 920, and may generate a first template 930, based on the determined face area 921. For example, the electronic device 200 may extract a face image corresponding to the face area 921 of the first image 920, and may generate a first template 930, based on the extracted face image. According to an embodiment, the electronic device 200 may determine a face area 921 of each of the multiple first images 920, and may generate multiple first templates 930, based on the determined face area 921.

According to an embodiment, the electronic device 200 may acquire multiple second images 910 by performing filtering (e.g., the filtering 701 in FIG. 7) of applying a first conversion filter to each of the multiple first images 920 in the secure execution environment of the memory 130. The multiple second images 910 are not images directly captured through the second camera device 225. However, the filtering (e.g., the filtering 701 in FIG. 7) is performed with respect to the multiple first images 920, and thus the multiple second images 910 may be substantially identical or similar to images captured through the second camera device 225.

According to an embodiment, the electronic device 200 may determine face areas from the multiple second images 910, and may generate multiple second templates 940, based on the determined face areas.

According to an embodiment, the electronic device 200 may store the multiple first templates 930 in the first template repository 413, and may store the multiple second templates 940 in the second template repository 414 which is physically separate from the first template repository 413 or separate therefrom in terms of software.

Figure 11:
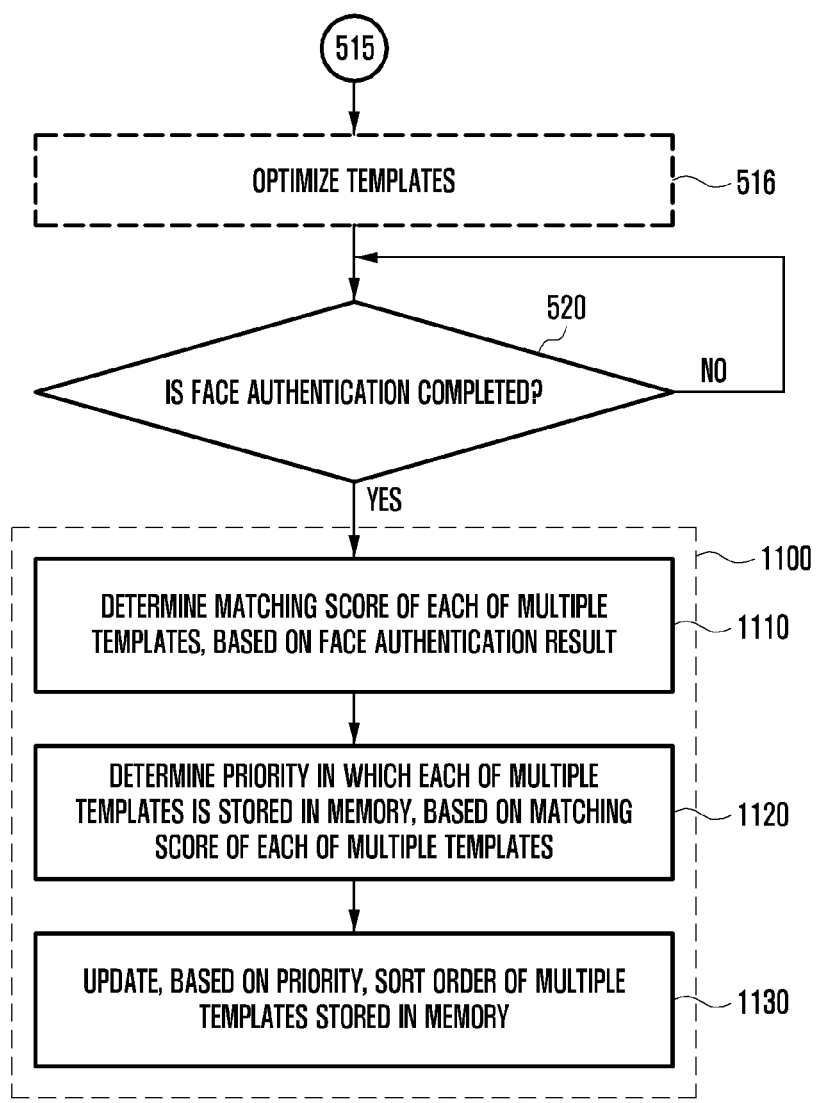
FIG. 11 is a flowchart illustrating an operation of managing multiple templates by an electronic device according to an embodiment of the disclosure.

FIG. 11 is a flowchart illustrating an operation of managing multiple templates by an electronic device according to an embodiment of the disclosure.

Figure 12:
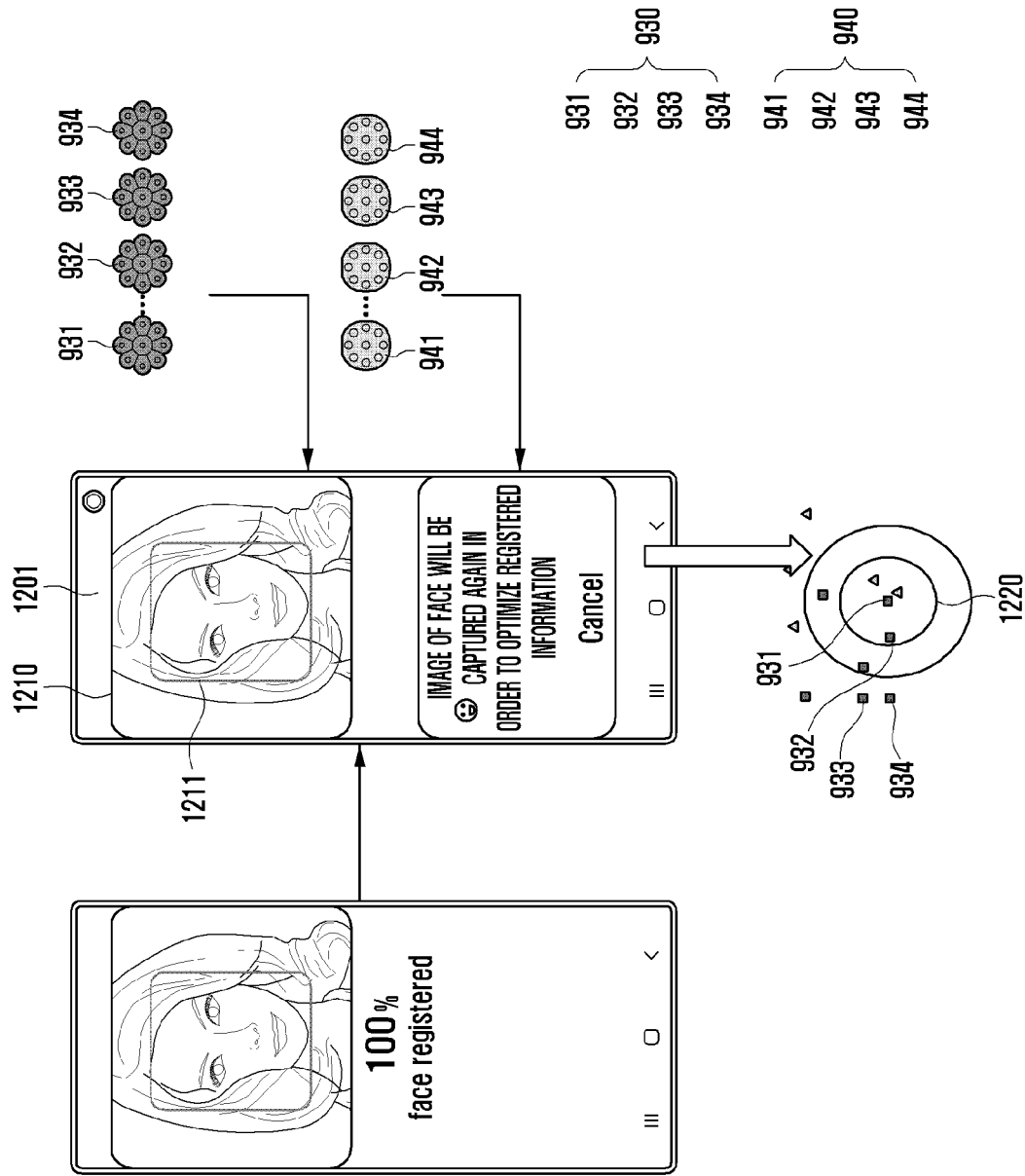
FIG. 12 illustrates an operation of optimizing multiple templates by an electronic device according to an embodiment of the disclosure.

FIG. 12 illustrates an operation of optimizing multiple templates by an electronic device 200 according to an embodiment of the disclosure.

Figure 13:
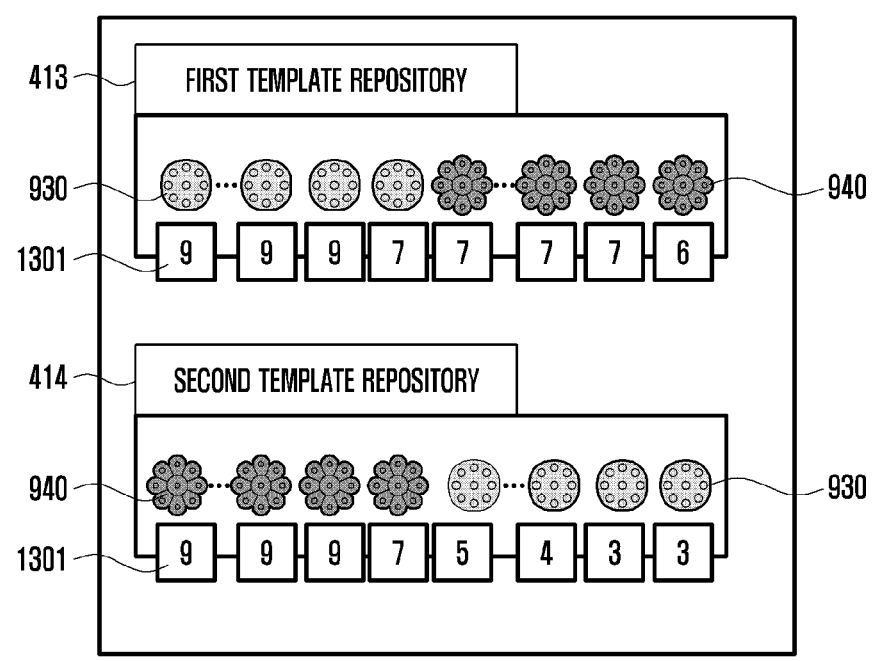
FIG. 13 illustrates an operation of adjusting priorities of multiple templates on the basis of a matching score by an electronic device according to an embodiment of the disclosure.

FIG. 13 illustrates an operation of adjusting priorities of multiple templates on the basis of a matching score by an electronic device according to an embodiment of the disclosure.

At least some of operations illustrated in FIG. 11 may be omitted. At least some operations described with reference to other drawings in various embodiments of the disclosure may be added before or after at least some operations illustrated in FIG. 11.

The operations illustrated in FIG. 11 may be performed by a processor 120 (e.g., the processor 120 in FIG. 1). For example, a memory 130 (e.g., the memory 130 in FIG. 1) of the electronic device 200 may store instructions which, when being executed by the processor 120, cause the electronic device 200 to perform at least some operations illustrated in FIG. 11.

Herein, an operation of managing multiple templates by the electronic device 200 according to an embodiment will be described in conjunction with FIGS. 11 to 13.

According to various embodiments, the electronic device 200 may perform an operation of managing multiple templates stored in the memory 130, for example, multiple first templates 930 and multiple second templates 940. For example, operation 510 of the electronic device 200, described with reference to FIG. 5, may further include operation 516 of optimizing multiple templates in a face information registration operation. Alternatively, after face authentication is completed, the electronic device 200 may further perform operation 1100 of adjusting matching scores and/or priorities of predesignated multiple templates, based on the result of the face authentication.

According to various embodiments, operation 516 and operation 1100 may be performed independently of each other.

Referring to FIG. 11, when the multiple first templates 930 and the multiple second templates 940 in the face information registration operation, the electronic device 200 according to an embodiment may perform, in operation 516, an operation of optimizing the generated templates.

Referring to FIG. 12, after the multiple first templates 930 and the multiple second templates 940 are generated, the electronic device 200 may provide a user interface 1201 for optimizing the generated templates. The electronic device 200 may request, through the user interface 1201, a user to capture a face image once again. The electronic device 200 may acquire an image (e.g., 1210 in FIG. 12) through the first camera device 216a and/or the second camera device 225, and may determine a face area (e.g., 1211 in FIG. 12) in the acquired image (e.g., 1210 in FIG. 12). The electronic device 200 may compare a face image corresponding to the determined face area (e.g., 1211 in FIG. 12) with the multiple first templates 930 and the multiple second templates 940, which are generated in advance.

According to an embodiment, the electronic device 200 may evaluate the degree of similarity of each of the multiple first templates 930 and the multiple second templates 940 to a face image (e.g., a face image corresponding to the face area 1211 in FIG. 12). According to an embodiment, the electronic device 200 may configure a designated reference value (e.g., 1220 in FIG. 12) with respect to the degree of similarity to the face image, may store only some templates having the degree of similarity that have values equal to or greater than designated reference value (e.g., 1220 in FIG. 12) among the multiple first templates 930 and the multiple second templates 940, and may delete the remaining templates having the degree of similarity that has a value smaller than the designated reference value (e.g., 1220 in FIG. 12).

For example, in FIG. 12, a template 931, a template 932, a template 933, and the template 934 are illustrated as multiple first templates 930 before performing the optimization operation. In addition, a template 941, a template 942, a template 943, and a template 944 are illustrated as multiple second templates 940 before performing the optimization operation. According to an embodiment, the multiple first templates 930 and the multiple second templates 940 may be configured such that templates generated based on one face image form a pair. For example, the electronic device 200 may acquire multiple face images by capturing images multiple times in the face information registration operation, and may generate a first template 930 and a second template 940, which are a pair of templates, from each of the face images.

According to the illustrated example, the template 931 and the template 941 may be configured to form a pair, and may be templates generated based on one face image.

According to the illustrated example, the template 932 and the template 942 may be configured to form a pair, and may be templates generated based on one face image.

According to the illustrated example, the template 933 and the template 943 may be configured to form a pair, and may be templates generated based on one face image.

According to the illustrated example, the template 934 and the template 944 may be configured to form a pair, and may be templates generated based on one face image.

According to an embodiment, the electronic device 200 may perform an operation of optimizing the multiple first templates 930 or the multiple second templates 940, and when one of a first template 930 and a second template 940, which are configured to form a pair, has a value smaller than a predesignated reference value (e.g., 1220 in FIG. 12), may delete all of the first template 930 and the second template 940, which are configured to form a pair. For example, the electronic device 200 may acquire a face image through the first camera device 216a, and may calculate the degree of similarity between the acquired face image and the template 931. When the degree of similarity of the template 931 has a value equal to or greater than the designated reference value (e.g., 1220 in FIG. 12), the electronic device 200 may store the template 931 and the template 941 forming a pair with the template 931, thereby completing optimization of the template 931 and the template 941. For example, the electronic device 200 may acquire a face image through the first camera device 216a, and may calculate the degree of similarity between the acquired face image and the template 933. When the degree of similarity of the template 933 has a value smaller than the designated reference value (e.g., 1220 in FIG. 12), the electronic device 200 may delete the template 933 and the template 943 forming a pair with the template 933, thereby completing optimization of the template 933 and the template 943. For example, the electronic device 200 according to an embodiment may acquire a face image through the second camera device 225, and may calculate the degree of similarity between the acquired face image and the template 941. When the degree of similarity of the template 941 has a value equal to or greater than the designated reference value (e.g., 1220 in FIG. 12), the electronic device 200 may store the template 941 and the template 931 forming a pair with the template 941, thereby completing optimization of the template 931 and the template 941. Although not illustrated, for example, the electronic device 200 may acquire a face image through the second camera device 225, and may calculate the degree of similarity between the acquired face image and the template 943. When the degree of similarity of the template 943 has a value smaller than the designated reference value (e.g., 1220 in FIG. 12), the electronic device 200 may delete the template 943 and the template 933 forming a pair with the template 943, thereby completing optimization of the template 933 and the template 943.

The electronic device 200 according to various embodiments may perform the optimization operation, thereby preventing unnecessary use of the memory 130 and increasing a processing speed.

In performing the optimization operation, the electronic device 200 according to various embodiments may perform the optimization operation in a background in the final operation of the face information registration operation without any additional input of a user. For example, the electronic device 200 may perform the optimization operation in a background while a progress rate of a designated value, for example, a registration progress rate of 80% is displayed through a user interface for registering face information.

Operation 520 illustrated in FIG. 11 may be at least partially similar or substantially identical to operation 520 illustrated in FIG. 5.

When face authentication is completed in operation 520 (e.g., the result of operation 520 is "Yes"), the electronic device 200 according to an embodiment may perform operation 1110. Operation 1110 may include the following operations.

In operation 1110, the electronic device 200 according to an embodiment may determine a matching score of each of multiple templates, based on the face authentication result. For example, the electronic device 200 may configure a matching score of each of the multiple first templates 930 and the multiple second templates 940, and the matching score may be adjusted based on the face authentication result. According to an embodiment, when a specific template among multiple templates succeeds in face authentication, the electronic device 200 may increase a matching score of the corresponding template. According to an embodiment, when a specific template among multiple templates fails in face authentication, the electronic device 200 may reduce a matching score of the corresponding template. The electronic device 200 may update, through the above-described method, optimal templates corresponding to a corresponding camera device whenever a user performs face authentication.

In operation 1120, the electronic device 200 according to an embodiment may determine, based on the matching score (e.g., 1301 in FIG. 13) of each of the multiple templates, priority on the basis of which each of the multiple templates is stored in the memory 130. The priority may be a factor which determines the sort order of the templates compared with a face image acquired through a camera device when the face authentication operation is performed. For example, when face authentication is performed through the first camera device 216a, the electronic device 200 may sequentially compare the templates, starting from templates having higher priority among the multiple first templates 930 and the multiple second templates 940 stored in the first template repository 413 corresponding to the first camera device 216a, with a face image acquired through the first camera device 216a. To this end, when being sorted in the first template repository 413, multiple templates may be sorted in the order from templates having higher priority to templates having lower priority.

In operation 1130, the electronic device 200 according to an embodiment may update, based on the priority, the sort order of the multiple templates stored in the memory 130.

Referring to FIG. 13, the electronic device 200 according to an embodiment may configure first storing and sorting, in the first template repository 413, multiple first templates 930 generated based on a characteristic of the first camera device 216a. After the above configuration, the electronic device 200 may receive a face authentication request through the first camera device 216a, and, when face authentication is successfully performed, in a face authentication operation, by using a designated second template generated based on a characteristic of the second camera device 225, may increase the priority and sort order of the designated second template in the first template repository 413.

Referring to FIG. 13, the electronic device 200 according to an embodiment may configure first storing and sorting, in the second template repository 414, multiple second templates 940 generated based on a characteristic of the second camera device 225. After the above configuration, the electronic device 200 may receive a face authentication request through the second camera device 225, and, when face authentication is successfully performed, in a face authentication operation, by using a designated first template generated based on a characteristic of the first camera device 216a, may increase the priority and sort order of the designated first template in the second template repository 414.

According to an embodiment, at the time of face authentication, the order of templates to be first matched may be determined based on the type of a camera device currently attempting authentication. For example, when a camera device attempting authentication is a UDC, templates generated in consideration of a characteristic of the UDC may be first used for a matching work, and subsequently, templates generated in consideration of characteristics of other camera device excluding the UDC may be used for the matching work.

For example, when a camera device attempting authentication is a UDC and when authentication is not completed although templates generated in consideration of a characteristic of the UDC has been used for a matching work, the electronic device may use, for the matching work, templates generated in consideration of characteristics of other camera device excluding the UDC. In a state in which the camera device attempting authentication is a UDC, when authentication is completed by the templates generated in consideration of the characteristics of other camera device excluding the UDC, the electronic device 200 may increase a matching score of the designated template (e.g., the matching score is increased by +1).

According to an embodiment, in a state in which the camera device attempting authentication is a UDC, when all templates of a template repository (e.g., the first template repository 413) configured to correspond to the UDC are not matched, an electronic device may use, for a matching work, templates included in a template repository (e.g., the second template repository 414) corresponding to another camera device. When authentication is completed through a designated template among the templates included in the template repository (e.g., the second template repository 414) corresponding to the other camera device, an electronic device may copy the designated template to the template repository (e.g., the first template repository 413) configured to correspond to the UDC, and may delete a template having the lowest matching score in the template repository (e.g., the first template repository 413) configured to correspond to the UDC.

FIG. 14 is a flowchart illustrating an operation of performing face authentication by an electronic device 200 according to an embodiment of the disclosure.

At least some of operations illustrated in FIG. 14 may be omitted. At least some operations described with reference to other drawings in various embodiments of the disclosure may be added before or after at least some operations illustrated in FIG. 14.

The operations illustrated in FIG. 14 may be performed by a processor 120 (e.g., the processor 120 in FIG. 1). For example, a memory 130 (e.g., the memory 130 in FIG. 1) of the electronic device 200 may store instructions which, when being executed by the processor 120, cause the electronic device 200 to perform at least some operations illustrated in FIG. 14.

The flowchart illustrated in FIG. 14 may include an embodiment which is at least partially similar to or different from operation 520 described with reference to FIG. 5.

Referring to FIG. 14, in operation 1410, the electronic device 200 according to an embodiment may receive a face authentication request. For example, the electronic device 200 may sense, based on an executed application, face authentication request event occurrence for identifying a person to be authenticated. For example, the electronic device 200 may perform, through face authentication, secure authentication required through a designated application, or may release the locked state of the electronic device 200.

In operation 1420, the electronic device 200 according to an embodiment may determine a camera device for performing face authentication, based on the state of the electronic device 200. According to an embodiment, the electronic device 200 may determine the state of electronic device 200, based on the reception of the face authentication request. For example, the electronic device 200 may determine whether the electronic device 200 is in a folded state or is in an unfolded state. According to an embodiment, when the electronic device 200 is in the unfolded state, the electronic device 200 may determine to perform face authentication through the first camera device 216a. According to an embodiment, when the electronic device 200 is in the folded state, the electronic device 200 may determine to perform face authentication through the second camera device 225.

In operation 1430, the electronic device 200 according to an embodiment may determine whether the camera device for performing face authentication is the first camera device 216a. According to an embodiment, when the camera device for performing face authentication is the first camera device 216a (e.g., the result of operation 1430 is "Yes"), the electronic device 200 may perform operation 1441. According to an embodiment, when the camera device for performing face authentication is not the first camera device 216a (e.g., the result of operation 1430 is "No", that is, when the camera device for performing face authentication is the second camera device 225, the electronic device 200 may perform operation 1451.

In operation 1441, the electronic device 200 according to an embodiment may acquire a first face image through the first camera device 216a. For example, the electronic device 200 may acquire a first image including a user's face and self-captured through the first camera device 216a, and may acquire the first face image corresponding to a face area from the first image.

In operation 1442, the electronic device 200 according to an embodiment may compare the first face image with multiple first templates and second templates, based on priority corresponding to the first camera device 216a. According to an embodiment, the electronic device 200 may refer to the first template repository 413 in order to perform face authentication through the first camera device 216a. In the first template repository 413, the multiple first templates 930 generated based on a characteristic of the first camera device 216a are first stored and sorted, and at least one second template generated based on a characteristic of the second camera device 225 may also be stored. According to an embodiment, the electronic device 200 may complete the face authentication, based on the result of comparing the first face image with the multiple first templates and second templates stored in the first template repository 413.

In operation 1451, the electronic device 200 according to an embodiment may acquire a second face image through the second camera device 225. For example, the electronic device 200 may acquire a second image including the user's face and self-captured through the second camera device 225, and may acquire the second face image corresponding to a face area from the second image.

In operation 1452, the electronic device 200 according to an embodiment may compare the second face image with multiple first templates 930 and second templates 940, based on priority corresponding to the second camera device 225. According to an embodiment, the electronic device 200 may refer to the second template repository 414 in order to perform face authentication through the second camera device 225. In the second template repository 414, the multiple second templates 940 generated based on a characteristic of the second camera device 225 are first stored and sorted, and at least one first template generated based on a characteristic of the first camera device 216a may also be stored. According to an embodiment, the electronic device 200 may complete the face authentication, based on the result of comparing the second image with the multiple first templates 930 and second templates 940 stored in the second template repository 414.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
   a first camera device having a first characteristic;
   a second camera device having a second characteristic different from the first characteristic;
   a memory; and
   a processor operatively connected to the first camera device, the second camera device, and the memory,
   wherein the memory is configured to store instructions which, when being executed, cause the processor to:
   receive a request for registration of face information through the first camera device,
   acquire, based on the request, multiple first images through the first camera device,
   perform filtering for each of the multiple first images to generate multiple second images reflecting the second characteristic of the second camera device,
   generate multiple first templates, based on the multiple first images,
   generate multiple second templates, based on the multiple second images, and
   store the multiple first templates and the multiple second templates in the memory, thereby completing the registration of the face information.

2. The electronic device of claim 1,
   wherein the memory comprises:
   a first template repository configured to correspond to the first camera device, and
   a second template repository configured to correspond to the second camera device, and
   wherein the first template repository and the second template repository are separate from each other in terms of hardware or software.

3. The electronic device of claim 2,
wherein the first template repository is configured to store the multiple first templates and the multiple second templates, the multiple first templates having priority applied thereto, and being thus arranged to precede the multiple second templates in a sort order, and
wherein the second template repository is configured to store the multiple first templates and the multiple second templates, the multiple second templates having priority applied thereto, and being thus arranged to precede the multiple first templates in a sort order.

4. The electronic device of claim 1,
wherein the first camera device is an under-display camera (UDC) disposed under a display area of a first display of the electronic device, and
wherein the second camera device is a camera device disposed at a part of a second display of the electronic device or around the second display.

5. The electronic device of claim 3, wherein the instructions, when executed, further cause the processor to:
receive a face authentication request through the second camera device after completing the registration of the face information,
compare, based on the face authentication request, the multiple first templates and the multiple second templates, stored in the second template repository, with an image acquired through the second camera device, and
determine, based on the comparison result, whether to perform face authentication.

6. The electronic device of claim 1,
wherein the instructions, when executed, further cause the processor to optimize each of the multiple first templates and each of the multiple second templates after completing the registration of the face information, and
wherein the instructions, when executed, further cause the processor to, as an optimization operation:
display a screen requesting a user to capture a face image again through a user interface,
calculate a degree of similarity of the face image of the user, captured through the first camera device, and a first template designated among the multiple first templates, and
when the degree of similarity of the designated first template has a value smaller than a designated reference value, delete the designated first template and a second template which is designated among the multiple second templates and forms a pair with the designated first template.

7. The electronic device of claim 4, further comprising:
a first housing;
a second housing; and
a hinge disposed between the first housing and the second housing,
wherein the first display is disposed to extend from a part of the first housing to the second housing, and
wherein the second display is disposed to face a direction opposite to a direction faced by the first display in an unfolded state in which the first housing and the second housing are placed parallel to each other.

8. The electronic device of claim 7,
wherein the first camera device is configured to capture an image by receiving light having passed through at least a part of the first display, and
wherein the second camera device is disposed to face a direction identical to the direction faced by the second display.

9. The electronic device of claim 8, wherein the instructions, when executed, further cause the processor to:
receive a face authentication request after completing the registration of the face information;
determine, based on the face authentication request, whether the electronic device is in the unfolded state or is in a folded state in which the first housing and the second housing face each other;
perform face authentication based on acquiring a face image through the first camera device, when the electronic device is in the unfolded state; and
perform authentication based on acquiring a face image through the second camera device, when the electronic device is in the folded state.

10. The electronic device of claim 1, wherein the instructions, when executed, further cause the processor to:
receive a request for registration of face information through the second camera device;
acquire, based on the request, multiple second images through the second camera device;
perform filtering for each of the multiple second images to generate multiple first images reflecting the first characteristic of the first camera device;
generate multiple first templates, based on the multiple first images;
generate multiple second templates, based on the multiple second images; and
store the multiple first templates and the multiple second templates in the memory, thereby completing the registration of the face information.

11. A method of an electronic device comprising:
a memory;
a first camera device having a first characteristic; and
a second camera device having a second characteristic different from the first characteristic, the method comprising:
receiving a request for registration of face information through the first camera device;
acquiring, based on the request, multiple first images through the first camera device;
performing filtering for each of the multiple first images to generate multiple second images reflecting the second characteristic of the second camera device;
generating multiple first templates, based on the multiple first images;
generating multiple second templates, based on the multiple second images; and
storing the multiple first templates and the multiple second templates in the memory, thereby completing the registration of the face information.

12. The method of claim 11,
wherein the memory comprises:
a first template repository configured to correspond to the first camera device, and
a second template repository configured to correspond to the second camera device, and
wherein the first template repository and the second template repository are separate from each other in terms of hardware or software.

13. The method of claim 12, further comprising:
storing the multiple first templates and the multiple second templates in the first template repository, the multiple first templates having priority applied thereto, and being thus arranged to precede the multiple second templates in a sort order; and storing the multiple first templates and the multiple second templates in the second template repository, the multiple second templates having priority applied thereto, and being thus arranged to precede the multiple first templates in a sort order.

14. The method of claim 11,
wherein the first camera device is an under-display camera (UDC) disposed under a display area of a first display of the electronic device, and
wherein the second camera device is a camera device disposed at a part of a second display of the electronic device or around the second display.

15. The method of claim 13, further comprising:
receiving a face authentication request through the second camera device after completing the registration of the face information;
comparing, based on the face authentication request, the multiple first templates and the multiple second templates, stored in the second template repository, with an image acquired through the second camera device; and
determining, based on the comparison result, whether to perform face authentication.

16. The method of claim 11, further comprising:
optimizing each of the multiple first templates and each of the multiple second templates after completing the registration of the face information,
wherein an optimization operation comprises:
displaying a screen requesting a user to capture a face image again through a user interface,
calculating a degree of similarity of the face image of the user, captured through the first camera device, and a first template designated among the multiple first templates, and
when the degree of similarity of the designated first template has a value smaller than a designated reference value, deleting the designated first template and a second template, which is designated among the multiple second templates and forms a pair with the designated first template.

17. The method of claim 16, wherein, when the degree of similarity of the first template has a value greater or equal to the designated reference value, store the first template and the second template together forming a pair.

18. The method of claim 14, wherein the electronic device further comprises:
a first housing;
a second housing; and
a hinge disposed between the first housing and the second housing,
wherein the first display is disposed to extend from a part of the first housing to the second housing, and
wherein the second display is disposed to face a direction opposite to a direction faced by the first display in an unfolded state in which the first housing and the second housing are placed parallel to each other.

19. The method of claim 18, further comprising:
capturing an image by the first camera device through reception of light having passed through at least a part of the first display,
wherein the second camera device is disposed to face a direction identical to the direction faced by the second display.

20. The method of claim 19, further comprising:
receiving a face authentication request after completing the registration of the face information;
determining, based on the face authentication request, whether the electronic device is in the unfolded state or is in a folded state in which the first housing and the second housing face each other;
performing face authentication based on acquiring a face image through the first camera device, when the electronic device is in the unfolded state; and
performing authentication based on acquiring a face image through the second camera device, when the electronic device is in the folded state.

21. The method of claim 20, wherein, when a folding state is an intermediate state, the electronic device is in the unfolded state when an angle between the first housing and the second housing is greater than a predetermined angle.

22. The method of claim 20, wherein, when a folding state is an intermediate state, the electronic device is in the folded state when an angle between the first housing and the second housing is less than or equal to a predetermined angle.

23. The method of claim 11, further comprising:
receiving a request for registration of face information through the second camera device;
acquiring, based on the request, multiple second images through the second camera device;
performing filtering for each of the multiple second images to generate multiple first images reflecting the first characteristic of the first camera device;
generating multiple first templates, based on the multiple first images;
generating multiple second templates, based on the multiple second images; and
storing the multiple first templates and the multiple second templates in the memory, thereby completing the registration of the face information.

* * * * *